US007512319B2

(12) United States Patent
Miyaki et al.

(10) Patent No.: US 7,512,319 B2
(45) Date of Patent: Mar. 31, 2009

(54) SYNCHRONOUS INFORMATION REPRODUCTION APPARATUS

(75) Inventors: Tsuyoshi Miyaki, Shizuoka-ken (JP); Satoshi Sekine, Shizuoka-ken (JP); Takahiro Ohara, Shizuoka-ken (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1896 days.

(21) Appl. No.: 09/881,148

(22) Filed: Jun. 14, 2001

(65) Prior Publication Data

US 2001/0055464 A1 Dec. 27, 2001

(30) Foreign Application Priority Data

Jun. 16, 2000 (JP) ............................. 2000-181449

(51) Int. Cl.
*H04N 7/087* (2006.01)

(52) U.S. Cl. .......................... 386/84; 714/746; 714/775

(58) Field of Classification Search .................. 386/46, 386/66, 68, 70, 71, 77, 84, 96, 61, 81, 100, 386/112, 120; 345/418-420; 714/746, 775
See application file for complete search history.

(56) References Cited

U.S. PATENT DOCUMENTS 4,206,483 A * 6/1980 Nakamura .................. 386/77
4,751,588 A * 6/1988 Tsujimura .................. 386/77
4,930,024 A * 5/1990 Kanda et al. .................. 386/77
5,208,677 A * 5/1993 Nishimura .................. 386/74
5,255,102 A * 10/1993 Fushiki .................. 386/70
5,256,832 A 10/1993 Miyake
5,504,758 A * 4/1996 Inoue et al. .................. 714/775
5,561,532 A * 10/1996 Ohnishi et al. .................. 386/47
5,574,568 A * 11/1996 Juri et al. .................. 386/112
5,587,804 A * 12/1996 Moon et al. .................. 386/2
5,627,935 A * 5/1997 Kim .................. 386/81
5,655,144 A 8/1997 Milne et al.
5,659,654 A * 8/1997 Nagasawa et al. .......... 386/120
5,679,912 A 10/1997 Asai et al.
5,699,473 A * 12/1997 Kim .................. 386/67
5,742,727 A * 4/1998 Kanota et al. .................. 386/26
5,770,811 A 6/1998 Haino et al.
6,331,851 B1 * 12/2001 Suzuki et al. .............. 345/419
6,400,888 B1 * 6/2002 Eerenberg et al. ............ 386/68
6,463,014 B1 10/2002 Kanou

FOREIGN PATENT DOCUMENTS

| | | |
|---|---|---|
| JP | 5080765 | 2/1993 |
| JP | 5108075 | 4/1993 |
| JP | 10-333673 | 12/1998 |
| JP | 11095778 | 4/1999 |
| JP | 11212552 | 8/1999 |

* cited by examiner

*Primary Examiner*—Thai Tran
*Assistant Examiner*—Mishawn Dunn
(74) *Attorney, Agent, or Firm*—Morrison & Foerster LLP

(57) ABSTRACT

In a synchronous information reproduction apparatus, a receiving section sequentially receives a clock signal. A storing section stores object information to be sequentially reproduced from a series of reproduction points. A reproduction point generating section generates location information indicative of a reproduction point of the object information stored in the storing section. A reproducing section reads and reproduces the object information from the storing section based on the reproduction point generated by the reproduction point generating section. A synchronizing section synchronizes an incremental speed of the reproduction point generated by the reproduction point generating section with a reception timing of the clock signal based on a reception time interval of the clock signals. An outputting section outputs contents of the object information reproduced by the reproducing section.

15 Claims, 11 Drawing Sheets

WHEN CYCLE OF TIMING CLOCK IS EXTENDED

WHEN CYCLE OF TIMING CLOCK IS SHORTENED

SYNCHRONOUS INFORMATION REPRODUCTION APPARATUS

BACKGROUND OF THE INVENTION

The present invention relates to a synchronous information reproduction apparatus, a synchronous information reproduction method and a storage medium storing therein a synchronous information reproduction program for synchronizing and reproducing multimedia information such as music performance information, polygon CG animation data, movie data and musical tone waveform sample data.

There is known a method of synchronizing and reproducing multimedia information such as musical tones, images and voices. For example, in parallel to reproduction of music performance information such as MIDI information, various kinds of multimedia information such as image information like CG (computer graphics) images, movie images, sound, and musical tone waveform information are reproduced.

However, in a conventional apparatus for reproducing multimedia information in association with music performance information, there is a problem that synchronism between the music performance information and the image information or the like is lost when a tempo of the music performance information is changed during the course of the reproduction.

Thus, in order to eliminate such a disadvantage, there is proposed a synchronous information reproduction method capable of synchronously reproducing a video even if a tempo of a musical tone which is automatically reproduced is changed during the course of the reproduction (Japanese Patent Application Laid-open No. 333673/1998). This method prepares a synchronization information table, in which location information indicative of a series of song points, music tempo information and a time at which these sets of information are updated are associated with each other. This conventional method can reproduce a video synchronized with a change in tempo of a song by making a reference to the table. As a result, even if a tempo of the song is changed along the way, the video can be reproduced without losing the synchronization. However, the synchronization information table must be prepared and this table needs to be sequentially restructured in this method. Thus, the synchronization processing and creation of the reproduction content are troublesome.

Further, another conventional apparatus which associates musical information with image information and the like for reproduction reproduces the musical information and the image information by a single player device, but does not reproduce the musical information and the associated image information by using a multiple of player devices connected through a network and the like.

Furthermore, in order to reproduce the musical information and the image information, a time difference after starting reproduction process or commanding reading of each information till an actual output is not taken into consideration, and hence there is no guarantee that each information is reproduced with desired timing.

Moreover, there is a demand for reproducing not only the image information but also other multimedia information such as musical tone, e.g., WAVE data or sound waveform sample data in association with the MIDI performance information.

SUMMARY OF THE INVENTION

Therefore, it is an object of the present invention to provide a synchronous information reproduction apparatus, a synchronous information reproduction method and a storage medium storing therein a synchronous information reproduction program capable of synchronously reproducing multimedia information with reduced processing burdens.

Further, it is another object of the present invention to provide a synchronous information reproduction apparatus, a synchronous information reproduction method and a storage medium storing therein a synchronous information reproduction program, capable of absorbing differences in the processing delay time of respective multimedia information, capable of completely synchronously reproducing the multimedia information.

Furthermore, it is still another object of the present invention to provide a synchronous information reproduction apparatus, a synchronous information reproduction method and a storage medium storing therein a synchronous information reproduction program, by which the processing cannot be interrupted when out of synchronism occurs.

To achieve this aim, according to one aspect of the present invention, there is provided a synchronous information reproduction apparatus comprising: a receiving section for receiving a clock signal; a storing section for storing object information; reproduction point generating section for generating information indicative of a reproduction point of the object information stored in the storing section; a reproducing section for reading and reproducing the object information from the storing section based on the reproduction point generated by the reproduction point generating section; a synchronizing section for synchronizing an incremental speed of the reproduction point generated by the reproduction point generating section with a reception timing of the clock signal based on a reception time interval of the clock signal; and an outputting section for outputting a content of the object information reproduced by the reproducing section.

Further, according to another aspect of the present invention, there is provided a synchronous information reproduction apparatus comprising: a receiving section for receiving a clock signal; a storing section for storing object information; a reproduction point generating section for generating information indicative of a reproduction point of the object information stored in the storing section; a reproducing section for reading and reproducing the object information from the storing section based on the reproduction point generated by the reproduction point generating section; a synchronizing section for synchronizing an incremental speed of the reproduction point generated by the reproduction point generating section with a reception timing of the clock signal based on a reception time interval of the clock signal; an outputting section for outputting a content of the object information reproduced by the reproducing section; and a reproduction point correcting section for measuring a time duration from start of reproduction process of the object information by the reproducing section till actual output of the object information from the outputting section and correcting the reproduction point in accordance with the measured time duration.

Furthermore, when a command by a user or an out of synchronism between the clock signal and the object information is detected or when stop of supply of the clock signal is detected, the operation of the synchronizing section is stopped, and the reproduction point is generated at a predetermined incremental speed in the reproduction point generating section.

Moreover, selection of the object information stored in the storing section and control of the reproduction process by the reproducing section are carried out in accordance with an externally supplied signal.

In addition, the object information is divided into blocks in accordance with the clock signal interval.

Additionally, according to still another aspect of the present invention, there is provided a synchronous information reproduction apparatus comprising: a storing section for storing a plurality of sets of object information; a reproduction point generating section for generating information indicative of respective reproduction points of a plurality of the sets of object information stored in the storing section; a reproducing section for reading and reproducing the plurality of the sets of object information from the storing section based on the reproduction points generated by the reproduction point generating section; an outputting section for outputting contents of the object information reproduced by the reproducing section; and a reproduction point correcting section for measuring, for each set of object information, a time duration from start of reproduction process of the object information by the reproducing section till actual output of the object information from the outputting section and correcting each reproduction point in accordance with the measured time duration.

Further, according to one aspect of the present invention, there is provided a synchronous information reproduction method for reproducing one or a plurality of sets of object information stored in a storing section in synchronization with a clock signal, comprising: a reception step of receiving the clock signal; a generation step of generating location information indicative of a reproduction point of the object information; a reproduction step of reading and reproducing the object information from the storing section based on the reproduction point generated by the generation step; a synchronization step of synchronizing an incremental speed of the reproduction point generated by the generation step with a reception timing of the clock signal based on a reception time interval of the clock signal; and an output step of outputting a content of the object information reproduced by the reproduction step.

Furthermore, according to another aspect of the present invention, there is provided a synchronous information reproduction method for reproducing one or a plurality of sets of object information stored in a storing section in synchronization with a clock signal, comprising: a reception step of receiving the clock signal; a generation step of generating location information indicative of a reproduction point of the object information; a reproduction step of reading and reproducing the object information from the storing section based on the reproduction point generated by the generation step; a synchronization step of synchronizing an incremental speed of the reproduction point generated by the generation step with a reception timing of the clock signal based on a reception time interval of the clock signal; an output step of outputting a content of the object information reproduced by the reproduction step; and a reproduction point correction step of measuring a time duration from start of processing in the reproduction step till actual output of the object information and correcting the reproduction point in accordance with the measured time duration.

Moreover, when a command by a user or an out of synchronism between the clock signal and the object information is detected or when stop of supply of the clock signal is detected, the operation of the synchronization step is stopped, and the reproduction point is generated at a predetermined incremental speed in the reproduction step.

In addition, according to still another aspect of the present invention, there is provided a synchronous information reproduction method for reproducing a plurality of sets of object information stored in a storing section, comprising: a generation step of generating information indicative of respective reproduction points of the plurality of the sets of object information stored in the storing section; a reproduction step of reading and reproducing the plurality of the sets of object information from the storing section based on the reproduction points generated by the generation step; an output step of outputting contents of the object information reproduced by the reproduction step; and a reproduction point correction step of measuring, for each object information, a time duration from start of processing in the reproduction step till actual output of the object information and correcting each reproduction point in accordance with the measured time duration.

Additionally, according to the present invention, there is provided a storage medium for storing therein a program for causing a computer to reproduce one or a plurality of sets of object information stored in a storing section in synchronization with a clock signal, the program comprising: a reception step of receiving the clock signal; a generation step of generating information indicative of a reproduction point of the object information; a reproduction step of reading and reproducing the object information from the storing section based on the reproduction point generated by the generation step; a synchronization step of synchronizing an incremental speed of the reproduction point generated by the generation step with a reception timing of the clock signal based on a reception time interval of the clock signal; and an output step of outputting a content of the object information reproduced in the reproduction step.

Further, according to another aspect of the present invention, there is provided a storage medium for storing therein a program for causing a computer to reproduce one or a plurality of sets of object information stored in a storing section in synchronization with a clock signal, the program comprising: a reception step of receiving the clock signal; a generation step of generating information indicative of a reproduction point of the object information; a reproduction step of reading and reproducing the object information from the storing section based on the reproduction point generated by the generation step; a synchronization step of synchronizing an incremental speed of the reproduction point generated by the generation step with a reception timing of the clock signal based on a reception time interval of the clock signal; an output step of outputting a content of the object information reproduced in the reproduction step; and a reproduction point correction step of measuring a time duration from start of processing in the reproduction step till actual output of the object information and correcting the reproduction point in accordance with the measured time duration.

Furthermore, the program further comprises a step of stopping the operation of the synchronization step and generating the reproduction point at a predetermined incremental speed in the reproduction step when a command by a user or an out of synchronism between the clock signal and the object information is detected or when stop of supply of the clock signal is detected.

Moreover, according to still another aspect of the present invention, there is provided a storage medium for storing therein a program for causing a computer to reproduce a plurality of sets of object information stored in a storing section in synchronization with a clock signal, the program comprising: a generation step of generating information indicative of respective reproduction points of the plurality of the sets of object information; a reproduction step of reading and reproducing the plurality of the sets of object information from the storing section based on the reproduction points generated by the generation step; an output step of outputting contents of the object information reproduced in the reproduction step; and a reproduction point correction step of measuring, for each set of the object information, a time duration from start of processing in the reproduction step till actual output of the object information and correcting each of the reproduction points in accordance with the measured time duration.

DETAILED DESCRIPTION OF THE INVENTION

Figure 1:
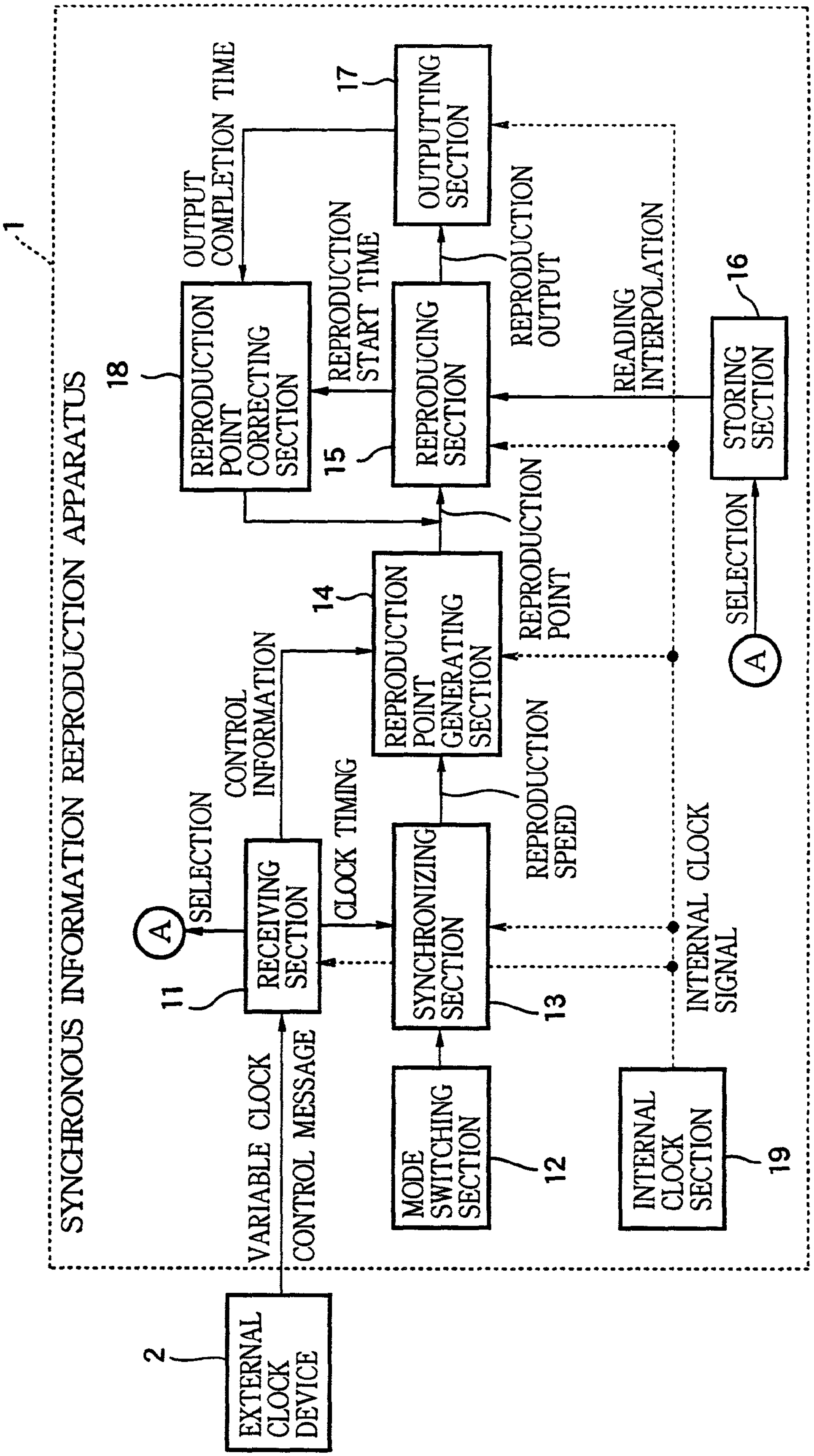
FIG. 1 is a functional block diagram showing a structure of a synchronous information reproduction apparatus to which a synchronous information reproduction method according to the present invention is applied.

FIG. 1 is a functional block diagram showing a structure of a synchronous information reproduction apparatus to which a synchronous information reproduction method according to the present invention is applied. In the drawing, a portion 1 surrounded by a broken line denotes a synchronous information reproduction apparatus for carrying out reproduction of object information, and 2 designates an external clock device for supplying a clock signal for synchronizing reproduction of the object information to the synchronous information reproduction apparatus 1.

In case of reproducing object information in synchronization with performance of a song, the object information including image information of, e.g., a still picture or a moving picture, CG animation image information indicative of the progression state of performance of the song, musical tone waveform information and voice information, a clock signal whose cycle corresponds to a performance tempo of the song is supplied from the external clock device 2, and the synchronous information reproduction apparatus 1 reproduces and outputs the object information in the form of the above-described various kinds of contents in synchronization with the clock signal. Here, even if the cycle of the clock signal supplied from the external clock device 2 is changed during reproduction of the object information due to a change in the performance tempo of the song, it is possible to following that change in cycle of the clock signal in the synchronous information reproduction apparatus 1 so that the object information can be reproduced and outputted without losing synchronization.

As a clock signal based on the music performance information of the song supplied from the external clock device 2, a timing clock (F8) of, e.g., a MIDI message can be used. Further, in such a case, as the external clock device 2, an external MIDI equipment such as a sequencer or a clock master can be used, and music performance information (MIDI data) of that song can be supplied to the synchronous information reproduction apparatus 1 together with the clock signal. Furthermore, both of the music performance information of that song and the object information can be reproduced and outputted in the synchronous information reproduction apparatus 1. Moreover, a plurality of the synchronous information reproduction apparatuses 1 can be connected to a single external clock device 2 in parallel, and a plurality of the synchronous information reproduction apparatuses 1 can be used to reproduce the object information on a plurality of mediums such as image, text, voice, sound and so on. In addition, reproduction and output of the music performance information may be performed by the external clock device and reproduction and output of the object information may be carried out by one or a plurality of synchronous information reproduction apparatuses 1.

Here, description will be given on the assumption that the control information (for example, a MIDI message) including information for designating start/end of the performance or information for selecting a song to be performed is supplied from the external clock device 2 to the synchronous information reproduction apparatus 1 together with the clock signal (for example, F8 of the MIDI message).

In the synchronous information reproduction apparatus 1, a reference numeral 11 denotes receiving section for receiving a clock signal and a control signal from the external clock device 2; 12, a mode switching section for setting a synchronous mode (an external synchronous mode or an internal synchronous mode) in the synchronous information reproduction apparatus 1; 13, a synchronizing section for setting a reproduction speed of object information stored in the storing section 16 in accordance with a reception timing of the clock signal from the receiving section 11; 14, reproduction point generating section for generating a reading position (reproduction point) of object information stored in the storing section 16 sequentially in accordance with the reproduction speed determined by the synchronizing section 13; 15, a reproducing section for reading the object information stored in the storing section 16, performing interpolation according to needs and thereafter generating a corresponding reproduction output signal; 17, an outputting section for outputting the object information in accordance with the reproduction output signal from the reproducing section 15; 18, a reproduction point correcting section for measuring a time duration from start of reproduction process by the reproducing section 15 till completion of the reproduction output in the outputting section 17 so as to correct the reproduction point from the reproduction point generating section 14; and 19, an internal clock section for generating an internal clock signal for specifying an operation timing of each of the constituent sections in the synchronous information reproduction apparatus 1.

As described above, although this synchronous information reproduction apparatus 1 has an external synchronous mode for reproducing the object information in synchronization with a clock signal fed from the external clock device 2, and an internal synchronous mode for reproducing the object information at a preset reproduction speed irrespective of the clock signal. Here, it is assumed that the external synchronous mode is set by the mode switching section 12. Incidentally, when a command by a user or collapse of the external synchronization is detected or failure in supply of the clock signal due to disconnection and the like is detected, the mode switching section 12 sets the operation mode to the internal synchronous mode so that the object information can be reproduced at the preset reproduction speed or the last reproduction speed before collapse of the synchronization.

In addition, object information which is reproduced in association with a song in accordance with a tempo of the song to be performed is stored in the storing section 16 as a sequence of data (reproduction data). For example, object information on various kinds of mediums such as polygon CG operation data (for example, sequence of data of joint angles of a skeleton model), MIDI performance data, movies, or WAVE data is stored as the sequence of data.

In the synchronous information reproduction apparatus 1 having such an arrangement, the clock signal and the control information (MIDI message) from the external clock device 2 are received by the receiving section 11 of the synchronous information reproduction apparatus 1; location information indicative of a reception timing of the received clock signal is supplied to the synchronizing section 13; control information indicative of start/stop of performance in the above-mentioned control information is supplied to the reproduction point generating section 14; and information for selecting a song to be performed in the above-mentioned control information is supplied to the storing section 16.

The synchronizing section 13 determines a reproduction speed of the object information stored in the storing section 16 based on the information indicative of the reception timing of the clock signal fed from the receiving section 11. That is, the synchronizing section 13 predicts a time until the next clock signal is received from a reception interval of the past clock signals, and calculates a speed for reading the object information to be reproduced until the next clock signal is received based on the prediction (an updating quantity, i.e., an increment amount of a reading address of reproduction data stored in the storing section 16). As a result, even if an incoming cycle of a variable clock signal is changed, reading of the reproduction data can be synchronized with the variable clock signal.

This reproduction speed information is supplied to the reproduction point generating section 14, and the reading address (reproduction point) of the reproduction data to be read from the storing section 16 is calculated in the reproduction point generating section 14 so that the reading address is supplied to the reproducing section 15.

The processing for generating the reproduction point by the reproduction point generating section 14 is executed in a cycle according to a type of the object information. For example, if the reproduction data is WAVE data, the reproduction point is updated in accordance with each cycle corresponding to the sampling frequency (for example, 44.1 kHz) of WAVE data. In case of CG data or movie data, the reproduction point is updated in accordance with a cycle determined according to a number of reproduction frames per one second (for example, 30 frames/second).

The reproducing section 15 reads corresponding reproduction data from the storing section 16 based on the reproduction point supplied from the reproduction point generating section 14, and generates the reproduction output signal according to the reproduction data so that the generated signal can be supplied to the outputting section 17. Usually, the interpolation processing in the order of a decimal fraction is carried out according to needs, since the reproduction point includes a decimal value. Specifically, this reproducing section 15 has means for reading the reproduction data from the storing section 16 and means for executing the interpolation processing according to needs. Further, if the object information is a CG animation image, the reproducing section 15 has a graphic engine or a decoder. If the object information is musical tone waveform sample data such as WAVE data, the reproducing section has a D/A converter.

The reproduction output signal outputted from the reproducing section 15 is supplied to the outputting section 17, and corresponding object is outputted. If the object information is image data, this outputting section 17 has a display unit. If the object information is musical tone waveform sample data, the outputting section 17 has a sound system.

Here, depending on types of object information, a time duration from start of the reproduction process by the reproducing section 15 till output of the object information to the outputting section 17 may differ. For example, in case of reproduction of a CG animation image, a three-dimensional coordinate calculation about an apex and a normal line of each object, light illumination and coloring, a texture coordinate calculation, polygon formation, a projection coordinate calculation, visual field clipping, bit map creation, and rendering processing (image generation processing) such as hidden surface/transmission processing are carried out based on scene information or operation data. On the other hand, in case of reproduction of musical tone waveform data, only the interpolation processing of the read musical tone waveform sample data can suffice. Furthermore, the time duration required for processing may differ depending on hardware used in the reproducing section 15. Therefore, the reproduction point correcting section 18 measures a time duration from start of the reproduction process by the reproducing section or from a command of reproduction to the reproducing section 15 till actual output of the object information to the outputting section 17, and shifts the reproduction point outputted from the reproduction point generating section 14 rearwards by a quantity corresponding to the measured time duration. Moreover, the obtained reproduction point is supplied to the reproducing section 15, and a deviation of the output timing caused due to a difference in contents type such as a sound or CG or in hardware used as the reproducing section is compensated so that the information of different types of mediums can be completely synchronously outputted with each other.

As described above, according to the synchronous information reproduction apparatus of the present invention, the cycle of the clock signal received in the synchronizing section 13 is measured, and a reception time of a next clock signal is predicted based on the measured cycle in order to determine a reading speed of the object information. Therefore, even if the cycle of the clock signal supplied from an external clock device is changed, the object information can be reproduced and outputted in synchronization with the clock signal.

Additionally, since the reproduction point correcting section 18 corrects the reproduction point so as to absorb a difference in processing time until the object information is outputted, the out of synchronization caused due to a difference in medium or a difference in hardware can be completely eliminated Embodiments of the synchronous information reproduction apparatus and the synchronous information reproduction method according to the present invention will now be described in detail hereinafter.

Figure 2:
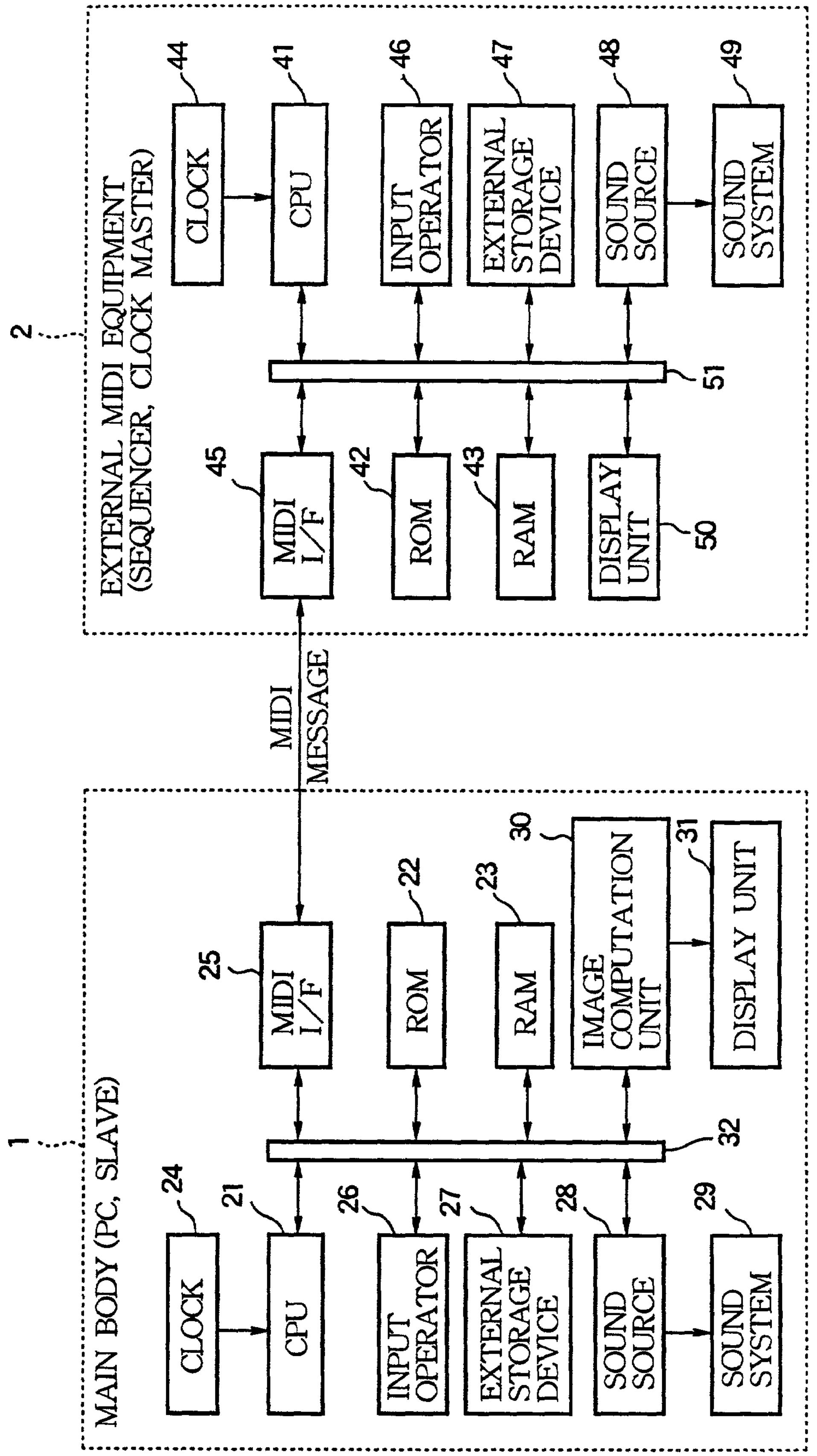
FIG. 2 is a view showing the structure of one embodiment of the synchronous information reproduction apparatus to which the synchronous information reproduction method according to the present invention is applied.

FIG. 2 is a view showing the structure of one embodiment of the synchronous information reproduction apparatus to which the synchronous information reproduction method according to the present invention is applied. In this drawing, reference numeral 1 denotes a main body corresponding to the above-described synchronous information reproduction apparatus, and it is assumed that a personal computer is used as the main body in this embodiment. In addition, reference numeral 2 designates the above-mentioned external clock device, and it is assumed that the external clock device is an external MIDI equipment such as a sequencer or a MIDI keyboard. Further, it is determined that the external MIDI equipment 2 functions as a master while the main body 1 serves as a slave. Selection of a song to be performed and control for start and end of reproduction of that song are carried out in the external MIDI equipment 2, and music performance information (MIDI data) of that song is supplied to the main body 1. Furthermore, synchronous reproduction process of object information such as CG of the performance operation and reproduction process of the received music performance information are executed in the main body 1.

In the main body 1, reference numeral 21 denotes a CPU for carrying out control of the main body 1; 22, a ROM storing therein a control program or various kinds of parameters; 23, a RAM used as a work area in which a program is loaded; 24, a clock generator for generating an operation clock or various kinds of timer interruptions; 25, a MIDI interface circuit (MIDI I/F) for transmitting/receiving MIDI data to/from the external MIDI equipment 2 and the like; 26, an input operator such as a character keyboard or a mouse; 27, an external storage device such as a hard disk device or a CD-ROM drive device; 28, a sound source for reproducing a musical tone waveform signal from MIDI data; 29, a sound system for D/A converting and amplifying a musical tone waveform signal from the sound source 28; 30, an image computation unit (graphic engine) for generating an image signal from CG image data indicative of a performance operation and the like or movie data; and 31, a display unit for displaying the CG image, the movie from the image computation unit 30 or various kinds of messages.

Further, in the external MIDI equipment 2, reference numeral 41 designates a CPU for controlling the entire operation of the external MIDI equipment 2; 42, a ROM for storing therein a control program and various kinds of parameters; 43, a RAM used as a work area and the like; 44, a clock generator for generating an operation clock and various kinds of timer interruptions; 45, a MIDI interface circuit (MIDI I/F) for inputting/outputting MIDI data with respect to the main body 1; 46, an input operator such as a MID keyboard, an operation panel and a wheel; 47, an external storage device such as a hard disk device; 48, a sound source for reproducing a musical tone waveform signal from MIDI data; 49, a sound system for D/A converting and amplifying a musical tone waveform signal from the sound source 48 to be outputted; and 50, a display unit for displaying various kinds of messages and the like.

Here, the external storage device 47 or the RAM 43 in the external MIDI equipment 2 stores therein music performance data (MIDI data, SMF (Standard MIDI File)) in accordance with each song to be performed, and the music performance data (MIDI data) of a selected song is supplied to the main body 1 through the MIDI interface 45.

The external storage device 27 or the RAM 23 in the main body 1 stores therein object information which is reproduced in association with the music performance in accordance with each song. In the above-described external synchronous mode, object information of a song to be selected by a MIDI message from the external MIDI equipment 2 is read and reproduced in synchronization with a timing clock (F8) included in the MIDI message.

The respective external storage devices 27 and 47 in the main body 1 and the external MIDI equipment 2 accommodate therein song files storing therein information concerning music performance in accordance with each song. Description will now be given as to the song files with reference to FIG. 3.

Figure 3:
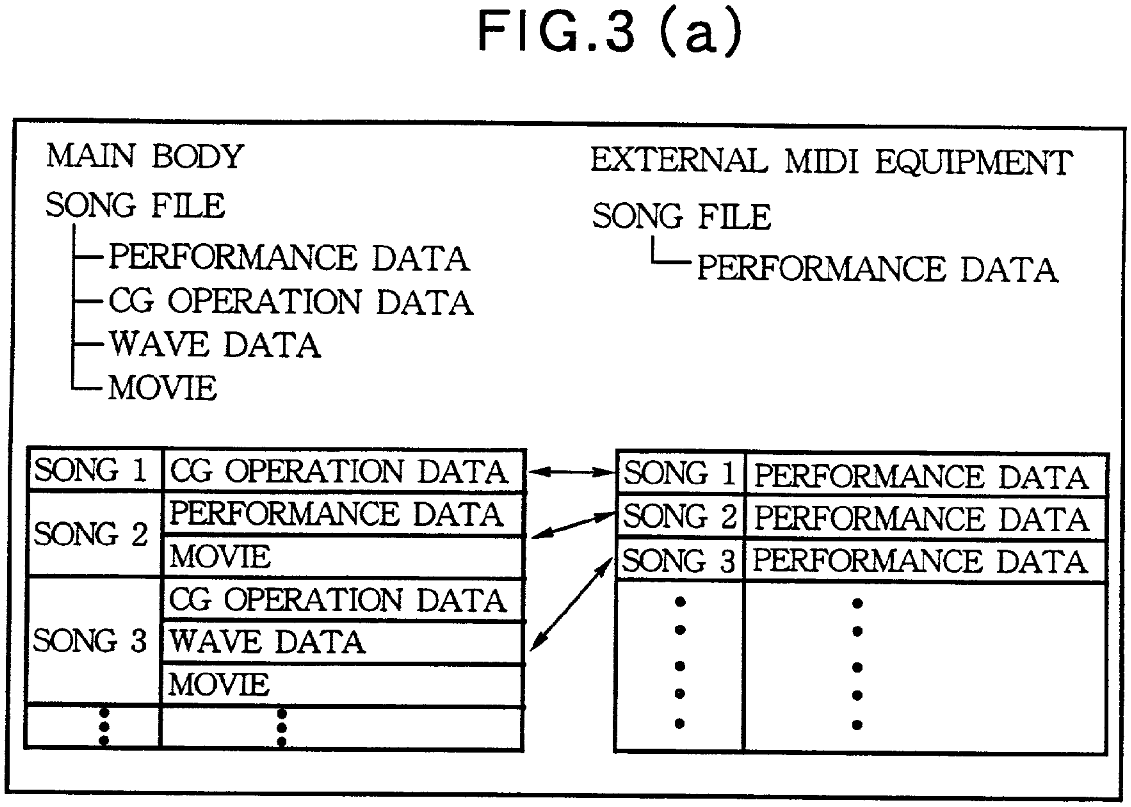
FIG. 3 is views for explaining each song file stored in a main body of the apparatus and an external MIDI equipment, in which FIG. 3(*a*) is a view showing an example of a song file, FIG. 3(*b*) is a view showing an example of the data structure of reproduction data, and FIG. 3(*c*) is a view showing another example of the data structure of reproduction data.
Figure 3:
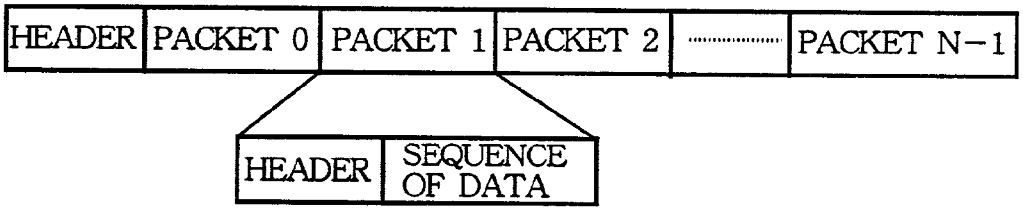
Figure 3:
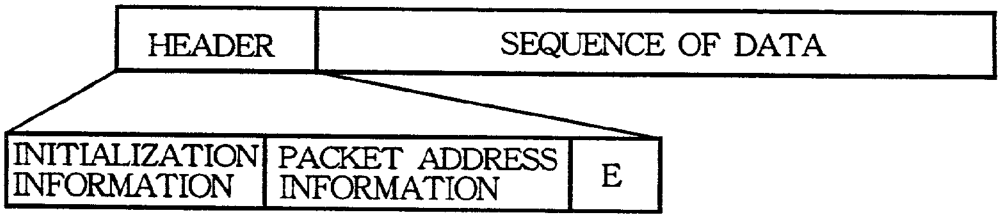

FIG. 3(*a*) is a table showing an example of a song file accommodated in each of the main body 1 and the external MIDI equipment 2. As shown in the drawing, in the song file of the external MIDI equipment 2, performance data is recorded in accordance with each song. The performance data is stored in the form of an SMF (Standard MIDI file) as described above. In the illustrative example, respective sets of performance data for songs 1 to 3 are stored.

Moreover, the song file stored in the main body 1 stores object information of various kinds of mediums such as music performance data, CG operation data, WAVE data and movie data which should be reproduced in association with music performance in accordance with each song. One or a plurality of sets of object information are prepared in accordance with the song to be performed. For example, in case of one song, only predetermined operation data for animating CG polygons is recorded as object information. In case of another song, both the similar operation data and the MIDI performance data are recorded. In the illustrative example, with respect to a song 1, the CG operation data is stored together with the performance data for the song 1 as the object information. The performance data and the movie data are stored for a song 2 as the object information, and the CG operation data, the WAVE data and the movie data are stored for a song 3 as the object information.

FIG. 3(*b*) is a diagram showing an example of a data structure of the object information stored in the main body 1. In the illustrative example, each set of object information is constituted by a header portion storing therein information of entire data and reproduction data consisting of a plurality of sets of packet data obtained by dividing the sequence of data into a plurality of blocks (which will be referred to as packets hereinafter) in matching with the clock timing. That is, in each packet, the reproduction data which should be reproduced after reception of the timing clock (F8) till reception of a next timing clock is arranged in time series.

Here, the reproduction data is divided into packets at intervals of the timing clocks (F8) and stored. Therefore, at the time of reproduction, a number of timing clocks (F8) received after start of reproduction equals to a packet number which is currently reproduced. Accordingly, comparing a number of received timing clocks (F8) with the packet number which is currently reproduced enables detection of the lost of synchronization of the reproduction data.

Supplementary information inherent to the object information such as a size of the entire object information or a number of packets is stored in the header portion of the object information. Taking the case where the object information is CG animation information for instance, there is stored information such as a data size, an object property (data such as a shape, an arrangement or a skeleton model of a polygon object, or a pointer indicative of an area in which data is stored), a number of packets, and reproduction speed information (default reproduction speed).

Here, the supplementary information (for example, the object property) may be stored in an additional file so that reference can be made to this file.

In addition, as shown in the drawing, the packet data is constituted by a header portion of each packet and time series data, and the header portion of the packet includes information indicative of, e.g., a packet size (or an address at the end of the packet) and a number of samples in the packet.

Incidentally, although the reproduction data is physically divided into packets in accordance with incoming intervals of the timing clocks in the example shown in FIG. 3(*b*), the reproduction data does not have to be physically divided into packets in this way. That is, as shown in FIG. 3(*c*), packet address information such as an address of reproduction data (address with a head position as a reference) according to timing clock reception timing may be enumerated in the header portion of the object information as a part of the header information so that the object information can be logically divided into packets at the timing of reading. That is, as shown in the drawing, in the header portion are stored an initialization information portion recording therein information similar to that in the header portion of the object information and packet address information indicative of an address of, sequence of data according to reception timing of each timing clock. It is to be noted that E denotes a code indicative of an end of the header.

Incidentally, when the object information is CG animation data indicative of the progressive state of music performance of the song, such animated reproduction data as that changes in a joint angle of the skeleton model of a performer with time are aligned in time series. In addition, in case of WAVE data or movie data, data recorded in a sampling cycle according to a type of data is provided.

Further, although the object information includes the performance data as described above, data having such a format as shown in FIGS. 3(*a*) and (*b*) does not have to be used as the performance data of MIDI. That is, since the MIDI data is synchronized with the timing clock (F8) from the external clock device 2, the usual MIDI file can be used as it stands.

Furthermore, although different files are used in accordance with each set of object information in the above description, a plurality of sets of reproduction data of different mediums or the same medium such as the graphic operation data (data indicative of an operation track of each part in a body of a performer or each part in an instrument in the CG animation) and the MIDI data may be stored in one file. Alternatively, they may be stored in different files and index data for making reference to a corresponding file may be prepared.

Description will now be given as to the state of synchronous reproduction in the synchronous information reproduction apparatus according to the present invention having such a structure.

As described above, in this embodiment, the external MIDI equipment 2 serves as a master to select a song to be performed or the control reproduction of the selected song and supplies music performance information of the selected song to the main body 1. Thus, the detail of MIDI messages supplied from the external MIDI equipment 2 and the outline of the processing in the main body 1 according to these messages will be first described. As is well known, the MIDI messages are roughly classified into channel messages (80 to EF) concerning the actual performance, and system messages (F0 to FF) commonly used in the entire MIDI system. The system messages are further divided into a common message, a real time message and an exclusive message. The external MIDI equipment 2 transmits selection information of a song to be performed, control information for controlling the reproduction operation, and a synchronous signal for reproducing the object information in synchronization with the performance of the song to the main body 1 by using the system message.

Upon starting the operation, the external MIDI equipment 2 transmits ACTIVE SENSING (FE) to the main body 1. As a result, the main body 1 can confirm that the external MIDI equipment 2 is connected. Furthermore, when a song to be performed is selected by the operation panel of the input operator 46 in the external MIDI equipment 2, a song number (ID) for designating the selected song is transmitted to the main body 1 by the SONG SELECT (F3). Consequently, the main body 1 loads the object information of the selected song. Moreover, when an FF (fast-forward) or REW (rewind) button is operated on the operation panel in the external MIDI equipment 2, the song position pointer (F2) is transmitted to the main body 1 in accordance with this operation, and a reproduction start position of the object information is set in accordance with this pointer. In addition, when start of performance is directed in the external MIDI equipment 2, START (FA) is transmitted, and the timing clock (F8) and a MIDI message such as channel messages (80 to EF) are also transmitted. In accordance with this transmission, the main body 1 starts to count the timing clock (F8), and also commences reproduction of the object information in synchronization with this counting. Additionally, the main body 1 transmits the channel message to the sound source 28 to start reproduction of the music performance information. Further, when the processing for stopping the performance is carried out on the operation panel in the external MIDI equipment 2, STOP (FC) is transmitted to the main body 1, and the main body 1 stops the music performance and the reproduction operation. Furthermore, when the operation for commanding restart is performed on the operation panel of the external MIDI equipment 2, CONTINUE (FB) is transmitted to the main body 1, and the main body 1 restarts the reproduction operation of the music performance information and the object information from the stopping position.

Description will now be given as to the state of synchronous reproduction of the object information in the synchronous information reproduction apparatus according to the present invention.

Figure 4:
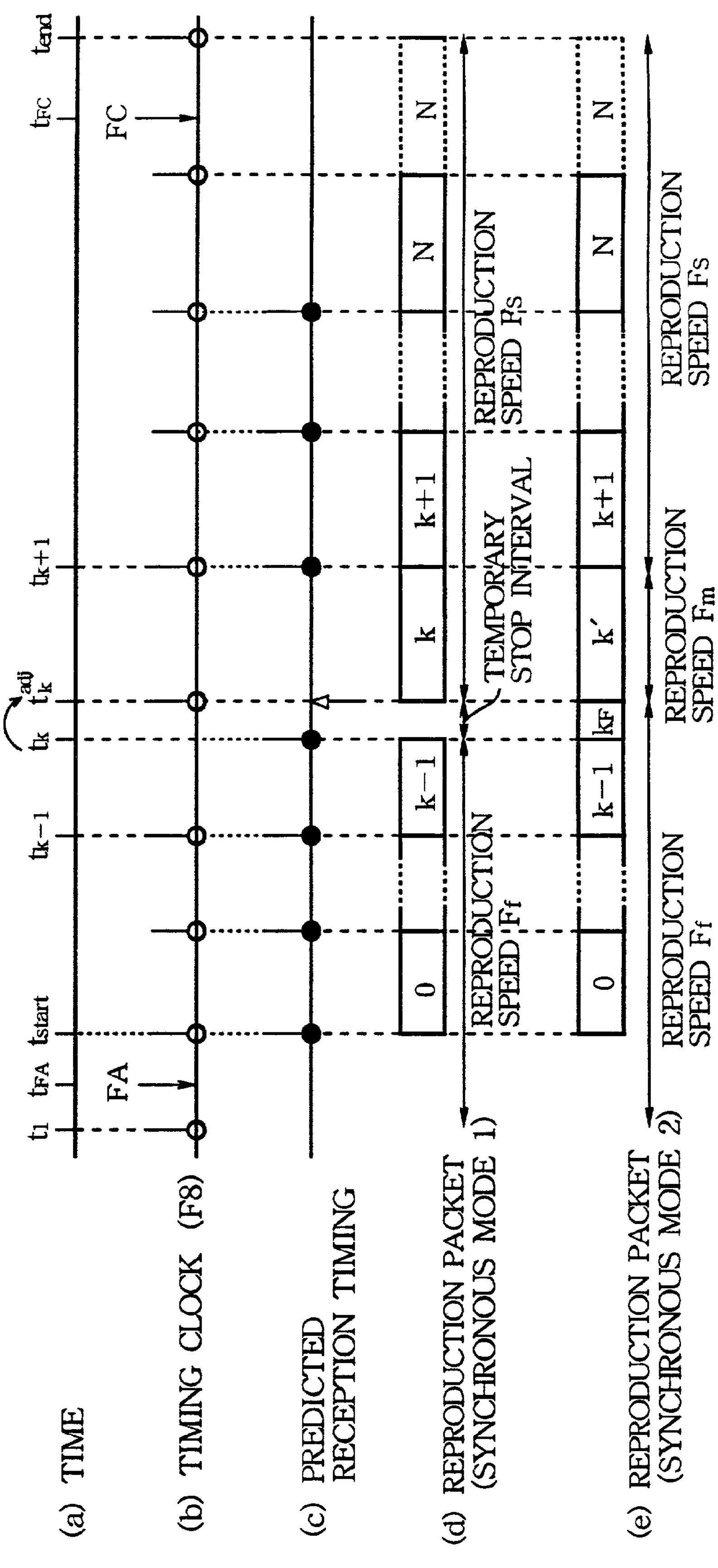
FIG. 4 is a view showing the state of synchronous reproduction when a cycle of a timing clock is extended during the course of performance in the synchronous information reproduction apparatus according to the present invention.
Figure 5:
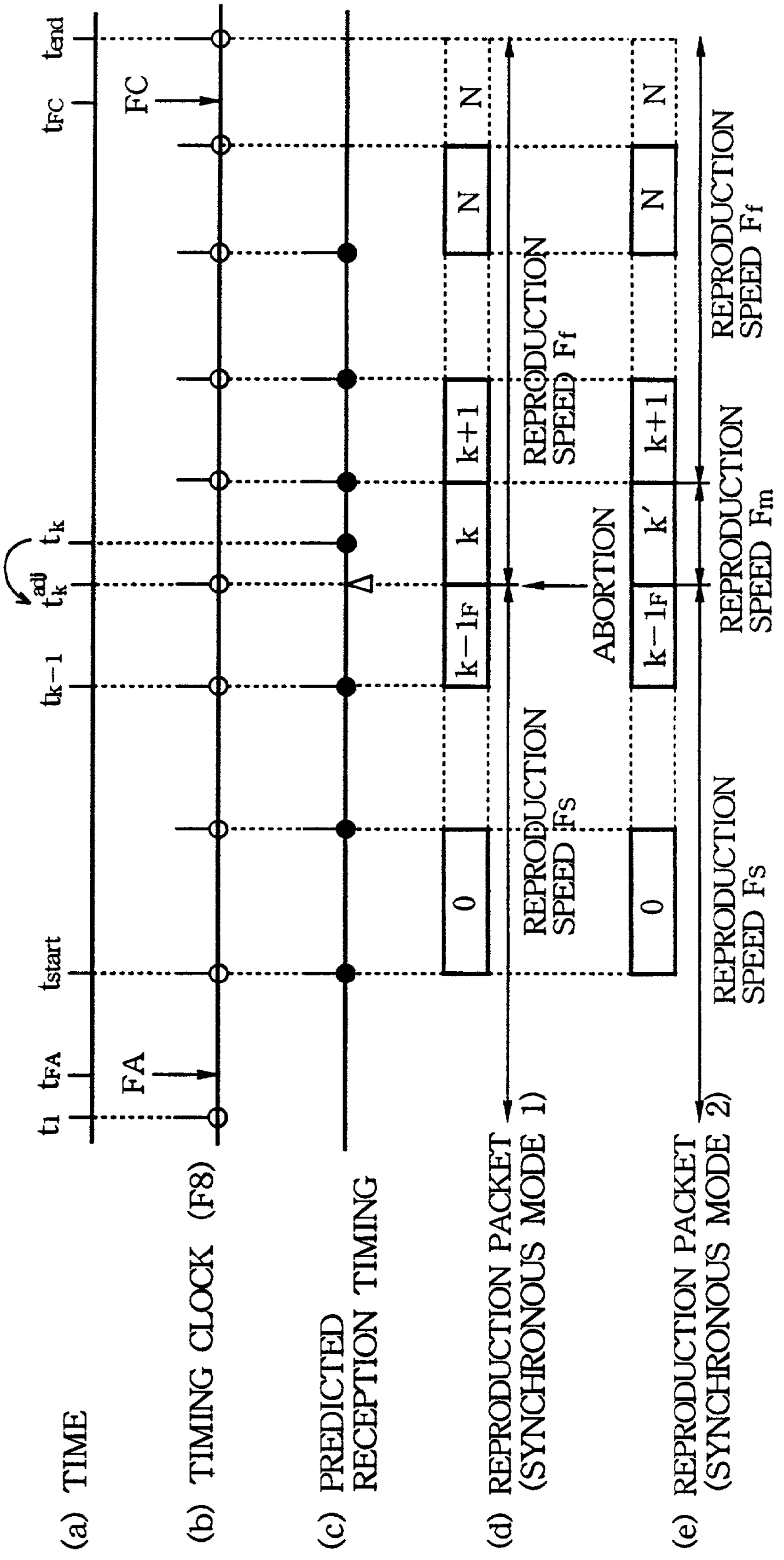
FIG. 5 is a view showing the state of synchronous reproduction when a cycle of the timing clock is shortened during the course of performance in the synchronous information reproduction apparatus.

FIGS. 4 and 5 are time charts showing the state of synchronous reproduction in the synchronous information reproduction apparatus according to the present invention having such an arrangement. FIG. 4 shows how the object information is reproduced while maintaining synchronization with the timing clock when the cycle of the timing clock (F8) is extended during the music performance, and FIG. 5 shows the same when the cycle of the timing clock is shortened. In these drawings, a horizontal axis represents a time axis; (a), a time; (b), reception timing of the timing clock (F8); (c), predicted reception timing of the timing clock; and (d) and (e), a packet of the reproduction data reproduced with each timing. The part (d) shows the state of reproduction in a first synchronous operation mode, and the part (e) shows the state of reproduction in a second synchronous operation mode. As described above, there are two synchronous operation modes, i.e., the first synchronous operation mode and the second synchronous operation mode in the present invention.

In FIGS. 4 and 5, before the time $t_1$, it is assumed that connection between the main body 1 and the external MIDI equipment 2 is confirmed by at least the ACTIVE SENSING (FE), and selection of reproduction data is carried out by the SONG SELECT (F3) mentioned above. Furthermore, it is assumed that the timing clock (F8) is transmitted for initial synchronization before REPRODUCTION COMMAND (FA). Therefore, at the time $t_1$, a number of received clocks is set to 0 with a packet position at the top (packet number: 0).

When REPRODUCTION COMMAND (FA) is received at the time $t_{FA}$, the reproduction operation is then started at the time $t_{start}$ at which the clock (F8) is received, and reading of the reproduction data is started from the packet 0.

Thereafter, the reading speed of the packet k is controlled based on intervals of the clocks (F8) measured immediately before. Moreover, in accordance with start of reading the packet k, a time $t_{k+1}$ at which incoming of a next clock is predicted is specified.

Synchronous Operation Mode 1

If the next clock (F8) is not received (incoming cycle of the clock is extended) upon completion of reading of the packet k−1, as shown in the synchronous operation mode 1 in FIG. 4(*d*), data at the tail end of the packet k−1 is repeatedly reproduced until the next clock arrives. Namely, the reproduction operation is temporarily stopped until the next clock arrives. Then, when the clock arrives at the time $t_k^{adj}$, the reading speed is recalculated, and reproduction of the packet k is started at the calculated reproduction speed $F_s$.

On the other hand, as shown in FIG. 5, if the incoming cycle of the clock (F8) is shortened when reading the packet k−1, the next clock arrives before the time $t_k$.

In such a case, reproduction of the current packet K−1is aborted when the clock arrives at the time $t_k^{adj}$ (synchronous operation mode 1 in FIG. 5(*d*)).

Then, the reading speed is recalculated, and reproduction of the packet k is started at the calculated reading speed $F_f$.

As described above, according to the synchronous operation mode 1, synchronization established between reproduction of the reproduction data and the clock signal can be maintained in both cases where the reception cycle of the clock signal is extended and where the same is shortened.

Synchronous Operation Mode 2

In the above-mentioned synchronous operation mode 1, it can be considered that reproduction is temporarily stopped when the clock cycle is extended, or the reproduction content becomes discontinuous when the clock cycle is shortened. As a countermeasure, in the synchronous operation mode 2, the synchronization processing is changed as follows.

If the next clock (F8) is not received (incoming cycle of the clock is extended) upon completion of reading of the packet k−1 ($t_k$), although the clock does not arrive at the time $t_k$, reading of the next packet k is started at the reproduction speed $F_f$ used up to this time for the meanwhile ($k_F$ in the drawing).

Then, when the clock arrives at the time $t_k^{adj}$, reproduction at the current speed is aborted, and reading speed of the packet data (the remaining part of the packet k: k') is recalculated based on the size of the remaining part of the packet k and the clock incoming interval ($t_k^{adj}-t_{k-1}$). In addition, the reproduction is carried out at the recalculated speed $F_m$. Thereafter, the subsequent packet is reproduced at a reading speed $F_s$ according to the timing clock (F8) having the extended cycle.

On the other hand, as shown in FIG. 5, if the incoming cycle of the clock (F8) is shortened during the reading of the packet k−1, the next clock arrives before reaching the time $t_k$.

In this case, as shown in FIG. 5(*e*), reproduction at the current speed $F_s$ is aborted when the clock reaches the time $t_k^{adj}$, and the reading speed $F_m$ of the packet data (remainder of the packet k−1+packet k) is recalculated based on the size of the remainder of the packet k−1+the packet k and the clock incoming interval ($t_k^{adj}-t_{k-1}$). Further, the remainder of the packet k−1+the packet k (=packet k') is reproduced at the recalculated reading speed $F_m$. Thereafter, reading of the packet is carried out at the reading speed $F_f$ according to the shortened cycle of the timing clock (F8).

Incidentally, in case of the synchronous operation mode 2, when the incoming cycle of the timing clock (F8) becomes double of the immediately preceding cycle, it is impossible to achieve synchronization on arrival of the next clock. Therefore, in case of detecting that the k-th timing clock (F8) corresponding to the packet k is yet to arrive, reading may be performed up to the tail end of the packet k and the reproduction operation may be similarly temporarily stopped as in the synchronous operation mode 1.

As described above, according to the synchronous operation mode 2, the clock signal and the reproduction of the data may be synchronized with each other, and the reproduction content can be prevented from becoming discontinuous.

Description will now be given as to the processing in the main body 1 and the processing in the external clock device (external MIDI equipment) 2 in order to effect the synchronous reproduction operation shown in the synchronous operation modes 1 and 2 mentioned above with reference to the flowcharts.

Figure 6:
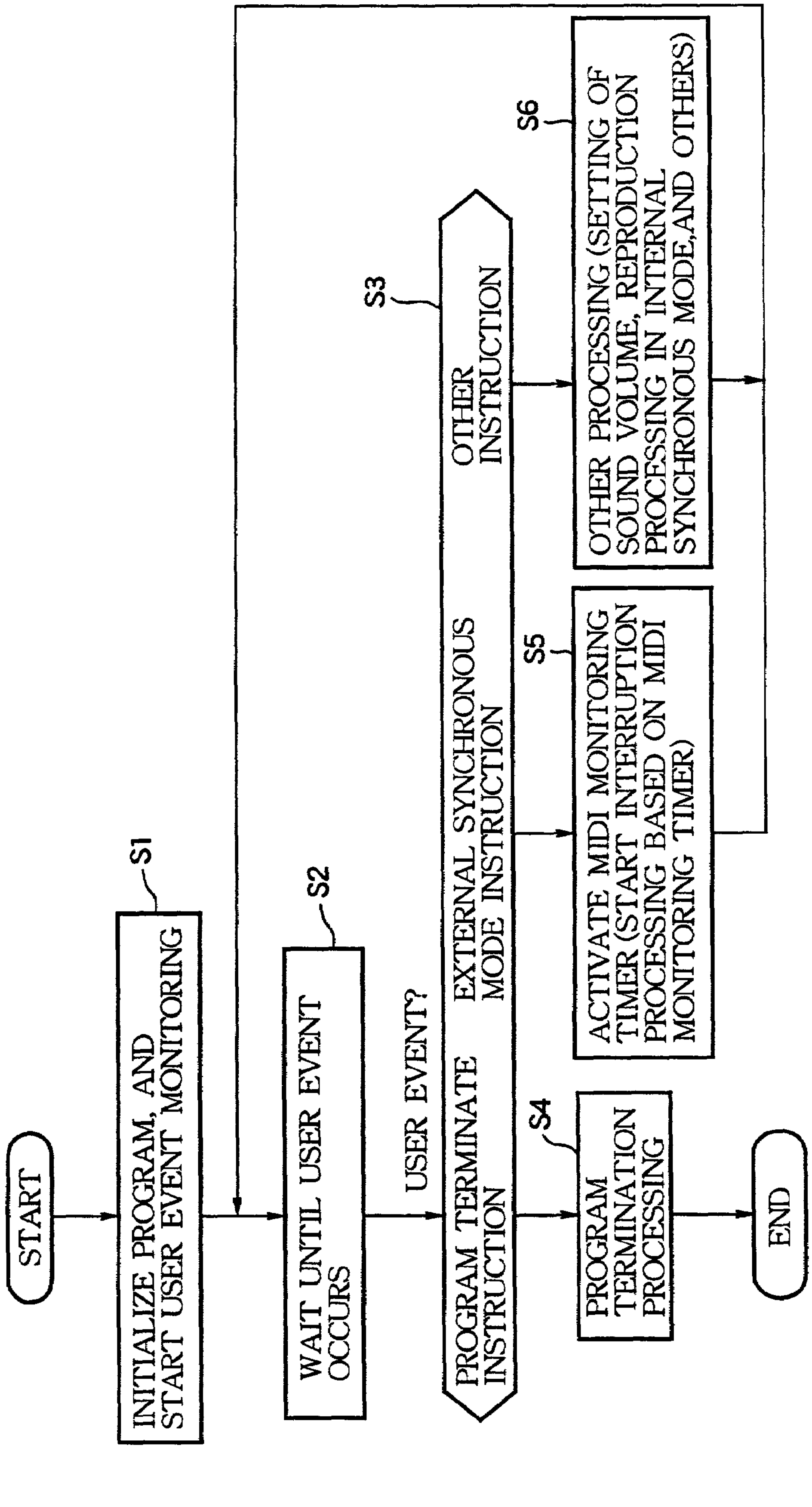
FIG. 6 is a flowchart for illustrating the overall operation of the main body of the inventive apparatus.
Figure 7:
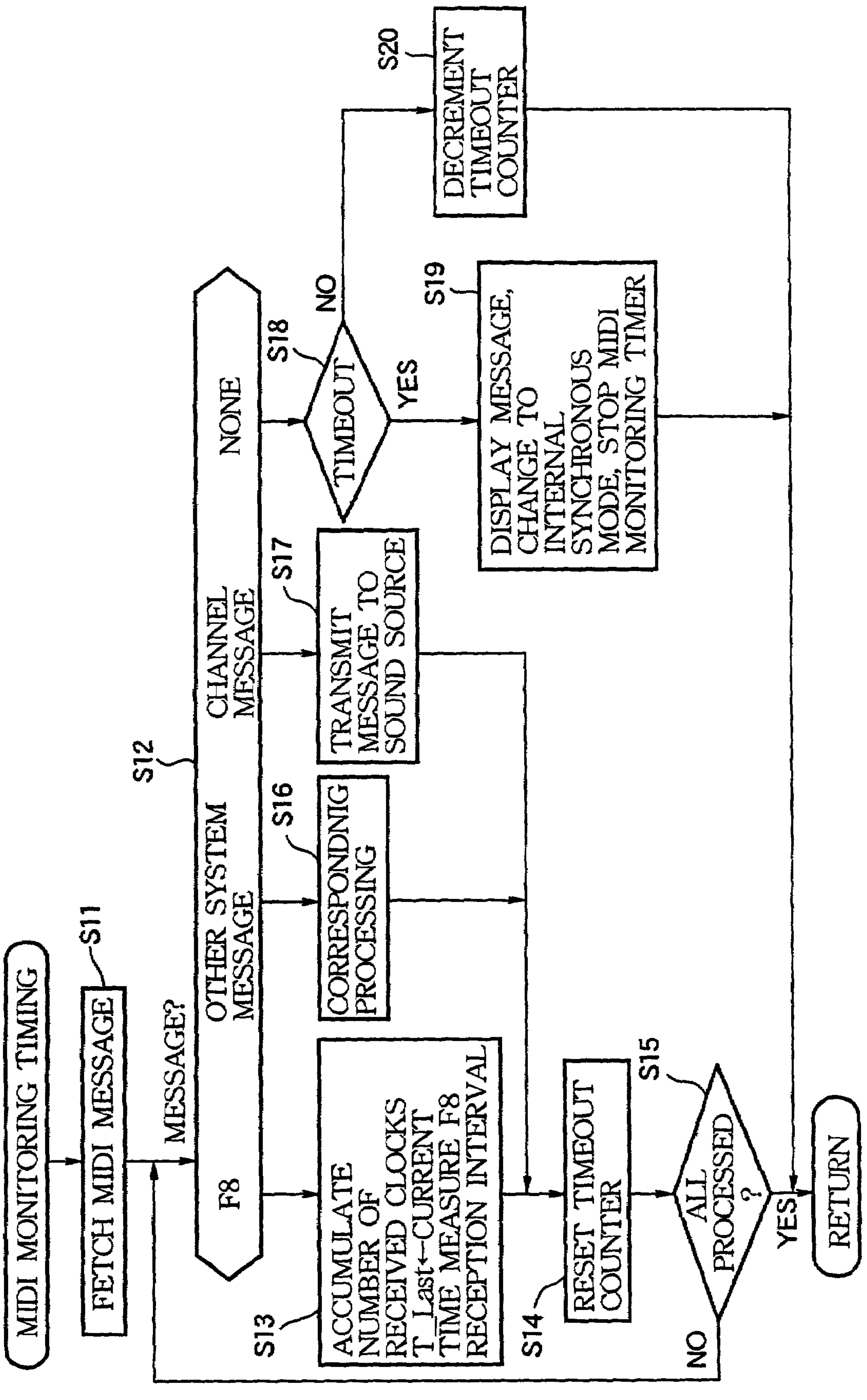
FIG. 7 is a flowchart of MIDI monitoring timer interruption processing.
Figure 8:
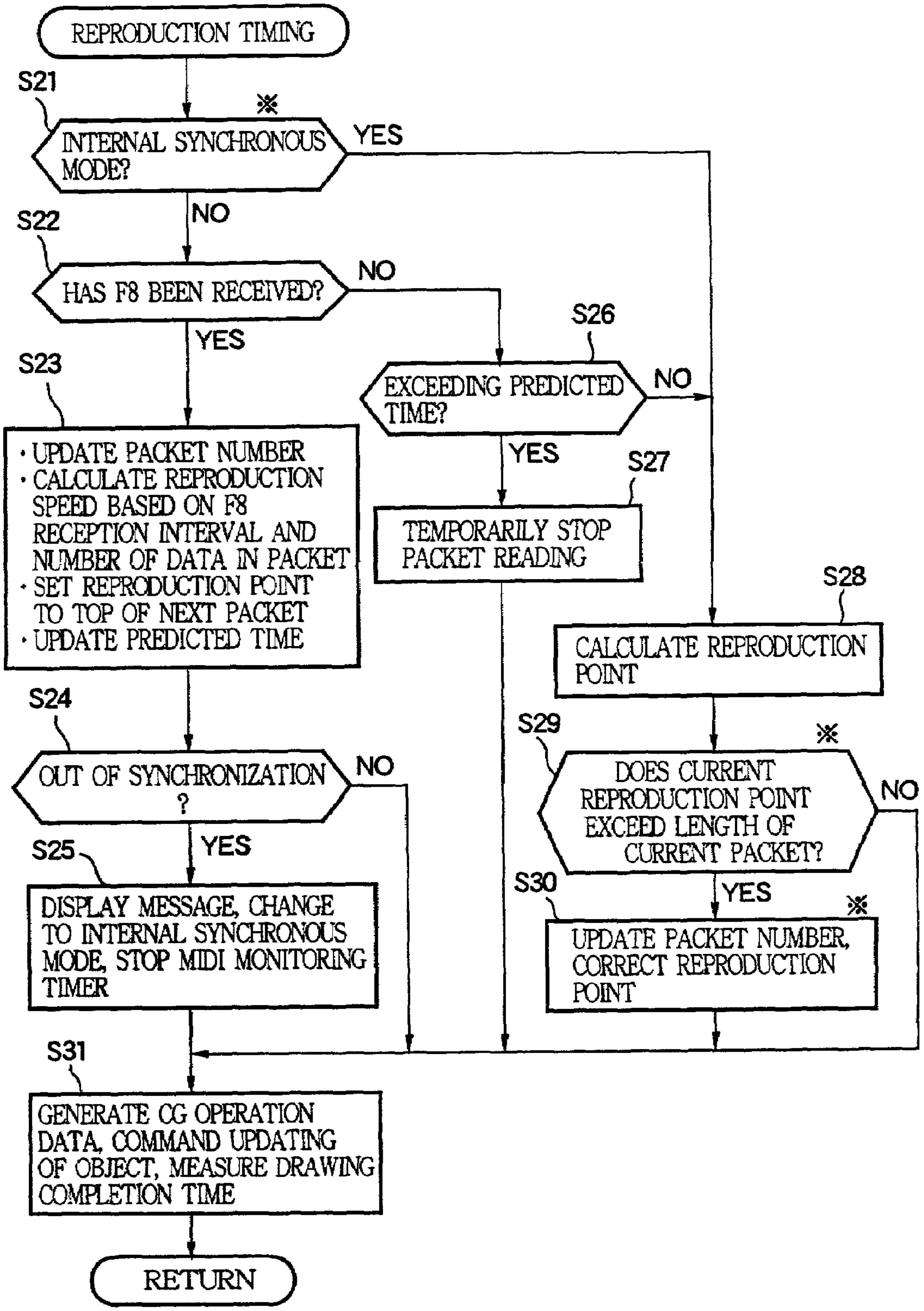
FIG. 8 is a flowchart of reproduction timer interruption processing for realizing a synchronous operation mode 1.
Figure 9:
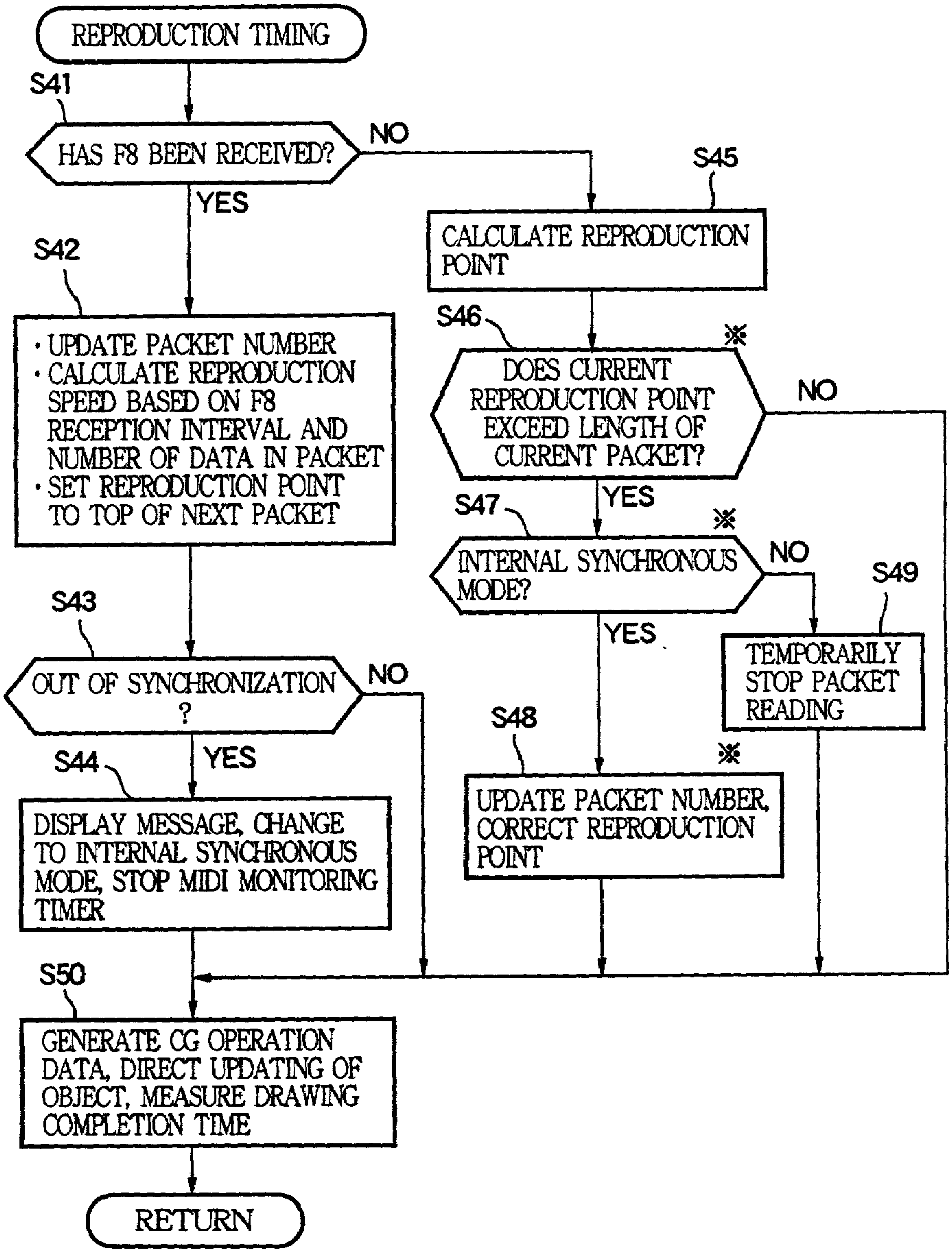
FIG. 9 is a flowchart showing a modification of the reproduction timer interruption processing for realizing the synchronous operation mode 1.
Figure 10:
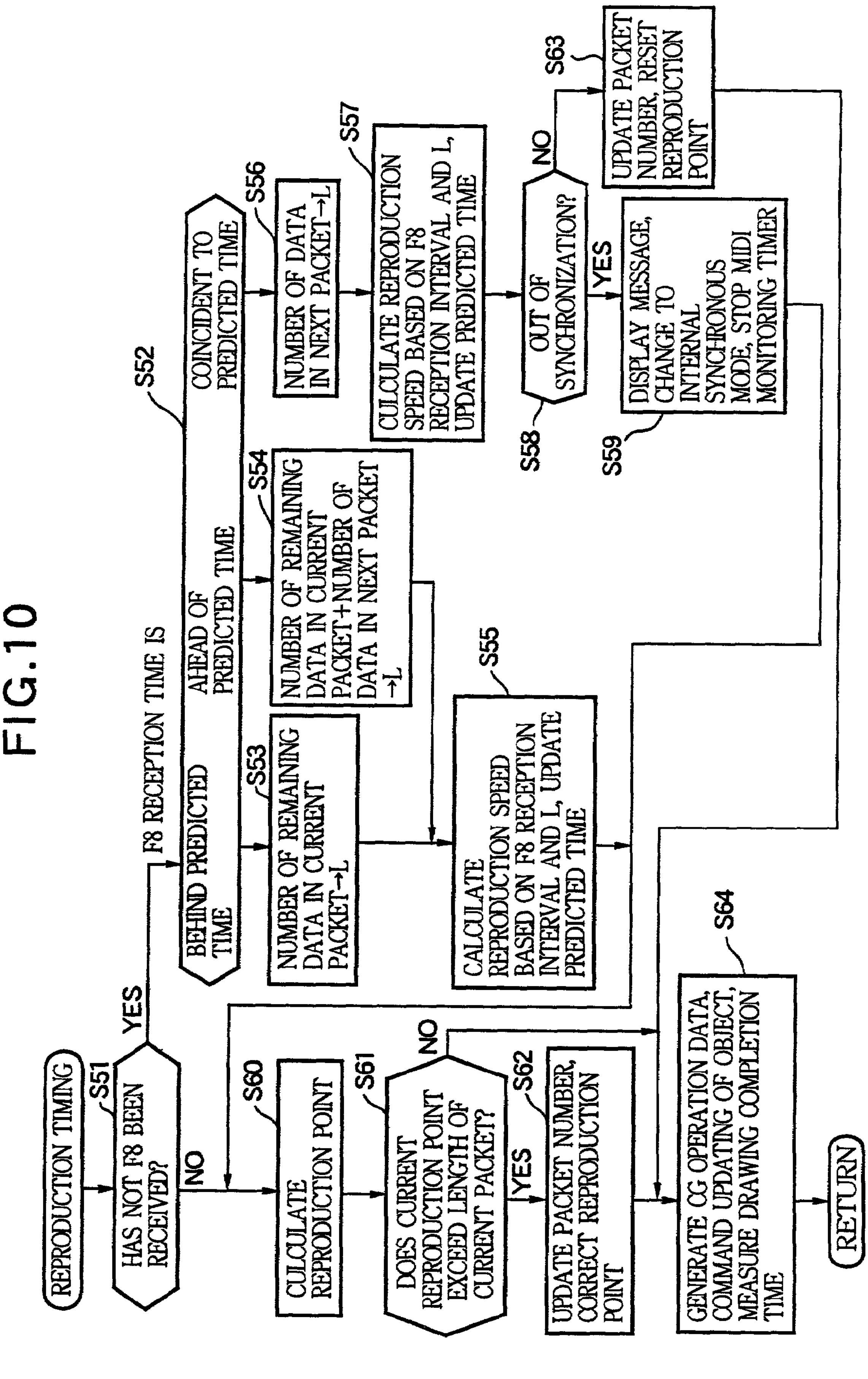
FIG. 10 is a flowchart of the reproduction timer interruption processing for realizing a synchronous operation mode 2.

FIG. 6 is a flowchart for explaining the overall operation of the main body 1; FIG. 7, a flowchart of the MIDI monitoring timer interruption processing; FIG. 8, a flowchart of the reproduction timer interruption processing in order to realize the synchronous operation mode 1; FIG. 9, a flowchart of a modification of the reproduction timer interruption processing illustrated in FIG. 8; FIG. 10, a flowchart of the reproduction timer interruption processing in order to realize the synchronous operation mode 2; and FIG. 11, an operation flowchart of the external MIDI equipment 2.

The main body 1 executes the synchronous reproduction process according to the present invention by the overall operation processing of the application program shown in FIG. 6, the MIDI monitoring timer interruption processing shown in FIG. 7, and the reproduction timer interruption processing illustrated in FIGS. 8 to 10. Here, both of the MIDI monitoring timer interruption processing and the reproduction timer interruption processing are activated by timer interruption generated by the MIDI monitoring timer and the reproduction timer provided in the clock generator 24 in a predetermined cycle. In the MIDI monitoring timer interruption processing, a MIDI message fed from the external MIDI equipment 2 is received and the processing according to that MIDI message is carried out. In the reproduction timer interruption processing, the processing for reproducing the object information is carried out in synchronization with the timing clock (F8).

In FIG. 6, when the operation of the application program for executing the synchronous information reproduction method according to the present invention is started in the main body 1, creation of various kinds of display windows, initialization of various kinds of parameters, and initialization processing such as preparation for event monitoring are first carried out to start monitoring of a user event in the step S1. Here, the user event is an event which is generated in response to the operation by a user using an input device such as a mouse. For example, there are an event for designating the external synchronous mode, an event for directing the internal synchronous mode, an event for designating termination of a program, and an event for controlling a sound volume.

The program waits until any user event is generated (step S2), and executes a predetermined operation in accordance with occurrence of an event (step S3).

That is, if the generated user event is a program termination command event, the processing advances to the step S4 to carry out the termination processing such as nullification of windows drawn on the display screen, stop of the reproduction timer (=stop of the reproduction process), stop of the MIDI monitoring timer (=stop of the processing according to the MIDI input), release of various kinds of memory areas and others, thereby terminating this program.

Moreover, if the external synchronous mode designating event is inputted, the processing proceeds to the step S5 to activate the MIDI monitoring timer. As a result, the MIDI monitoring timer generates an interruption event for effecting the MIDI monitoring timer interruption processing in a predetermined cycle. Then, the processing returns to the step S2 and waits until a user event again occurs.

If other event is generated, the processing according to the event is conducted (step S6). That is, if there occurs an event such as designation of the internal synchronous mode, start of reproduction in the internal synchronous mode, command of stop and the like, setting of a sound volume, various settings of CG (selection of a background, setting of a view point and others), selection of a medium for actually performing reproduction in case of multiple kinds of reproduction mediums, and others, the processing according to the event is carried out. Then, the processing returns to the step S2 and waits for occurrence of a new user event. The above is a flow of the processing of the main routine in the main body 1.

FIG. 7 is a flowchart of the MIDI monitoring timer interruption processing. As described above, when the external synchronous mode is set, the MIDI monitoring timer is activated (step S5), and the MIDI monitoring timer interruption processing is executed by the interruption event generated by the MIDI monitoring timer in a predetermined cycle. In the MIDI monitoring timer interruption processing, a MIDI message supplied from the external MIDI equipment 2 is first fetched in the step S11. Then, the corresponding processing is carried out in accordance with a type of the fetched MIDI message (step S12).

At first, if there is no MIDI message received in the step S11, the processing proceeds to the step S18, and judgment is made as to whether a predetermined time (for example, 300 msec) has passed after reception of the last MIDI message. This judgment is effected based on whether a timeout counter for counting the predetermined time is timed out. If there is no reception of any message within the predetermined time (if a result of judgment in the step S18 is YES), it is regarded that connection with the external MID device 2 is broken, and the mode is automatically changed to the internal synchronous mode. In addition, a message indicative of this change is displayed on the display unit 31 to stop the operation of the MIDI monitoring timer (step S19). Therefore, the MIDI monitoring timer interruption processing is not thereafter carried out unless the external synchronous mode is designated.

Additionally, if the predetermined time has not passed after reception of the last MIDI message, a result of judgment in the step S18 is NO, and the timeout counter is decremented (step S20). Consequently, counting by the timeout counter proceeds.

If the MIDI message is received and the MIDI message is fetched in the step S11, the processing according to the message is performed.

If the received message is a channel message (80 to EF) concerning actual performance, the processing advances to the step S17, and that message is supplied to the sound source 28 (FIG. 1). As a result, the processing according to that MIDI message is effected, and the automatic performance is hence carried out. Subsequently, the processing proceeds to the step S14, and the timeout counter is reset. Then, judgment is made as to whether the processing is completed with respect to all of the MIDI messages fetched in the step S11. If any other message is fetched, the processing returns to the step S12, and the processing according to that message is executed. Further, if the processing with respect to all of the messages is completed, the current MIDI monitoring timer interruption processing is terminated, and the processing returns to the overall processing (FIG. 6).

If the MIDI message fetched in the step S11 is a timing clock (F8), the processing advances to the step S13. This timing clock (F8) is a variable clock, 24 pulses of which are transmitted with respect to one crotchet. Further, the transmission interval of this clock is appropriately changed in accordance with a performance tempo. For example, in case of Tempo=100, since there are 100 crotchets per one minute, the transmission interval of F8 is 60/(100×24) sec=25 msec.

In the step S13, a count value of a counter for counting a number of received clocks is incremented (+1), and a current time is substituted for a clock reception time register T_Last. Furthermore, a difference from the previous F8 reception time is taken and a timing clock (F8) reception interval Δt is measured. Moreover, the processing proceeds to the step S14, and the timeout counter is reset. If there is no received MIDI message which is yet to be processed, the current MIDI monitoring timer interruption processing is terminated.

In addition, if the MIDI message fetched in the step S11 is other system message, the processing according to the message is carried out in the step S16, and the timeout counter is then reset in the step S14. Thereafter, the processing proceeds to the step S15.

For example, if the received MIDI message is SONG POSITION POINTER (F2) for informing of a point at which music performance should be started, the SONG POSITION POINTER (F2) is transmitted to the sound source 28 in the step S16. Additionally, a reproduction start position of the object information is set, namely, the number of a packet to be reproduced is set to a position designated by the SONG POSITION POINTER (F2). This SONG POSITION POINTER (F2) is usually designated in units of one beat (F8×6).

If the received MIDI message is SONG SELECT (F3), reproduction data having an ID designated by the SONG SELECT (F3) is selected from the reproduction data stored in the external storage device 27 in the step S16, and the selected reproduction data is loaded into the RAM 23. In this connection, if the SONG SELECT (F3) is received during reproduction of a song, reproduction of that song may be forcibly terminated.

If the received MID message is START (FA), the position of the packet to be reproduced in the reproduction data selected by the SONG SELECT (F3) is reset to the top position, and the reproduction timer is activated. The reproduction timer generates an interruption event for carrying out the reproduction process of the reproduction data in a predetermined cycle F, thereby starting the reproduction operation.

If the received MIDI message is CONTINUE (FB), the reproduction operation is restarted from a position of the packet designated by the SONG POSITION POINTER (F2) in the reproduction data selected by the SONG SELECT (F3) or a position of the packet at which reproduction is stopped by STOP (FC). That is, the reproduction timer is activated or reactivated.

If the received MID message is STOP (FC), the reproduction timer is stopped to halt the reproduction process. Meanwhile, if the STOP (FC) is received during the reproduction, the reproduction point is set in units of one beat.

If the received MID message is ACTIVE SENSING (FE), the processing of the step S16 is terminated as it is, thereby proceeding to the step S14.

Incidentally, a number of received clocks in the later-described reproduction timer interruption processing is basically reset to 0 in accordance with reception of START (FA) mentioned above. However, if the SONG POSITION POINTER (F2) is received or if reproduction is stopped by the STOP (FC), a number of received clocks is set to a number corresponding to the SONG POSITION POINTER (F2) or a number corresponding to a packet position at which reproduction is stopped by the STOP (FC) and thereafter restarted.

As described above, in the MIDI monitoring timer interruption processing, the MIDI message is fetched in accordance with a predetermined cycle, and the processing according to the received MIDI message is performed. Furthermore, if no MIDI message is received beyond a predetermined time (for example, 300 msec), it is determined that the connection with the external MIDI equipment 2 is broken, and the processing for switching to the internal synchronous mode is carried out.

Description will now be given as to the reproduction timer interruption processing. It is to be noted that reproduction of a single set of object information will be explained hereinafter for the sake of simplicity. In case of reproducing a plurality of sets of object information, the processing such as generation of a reproduction point, reading of reproduction data, generating of a reproduction output signal and others may be carried out relative to respective sets of reproduction data in parallel.

Description will be first given on the reproduction timer interruption processing in case of performing the processing in the synchronous operation mode 1 explained with reference to FIGS. 4(*d*) and 5(*d*). FIG. 8 is an operation flowchart of the reproduction timer interruption processing in order to enable the operation in the above-mentioned synchronous operation mode 1.

As described above, if reproduction of the object data is directed by START (FA), CONTINUE (FB) or a user event, the reproduction timer is made active, and this processing is executed in accordance with a predetermined interruption cycle F.

In this reproduction timer interruption processing, judgment is first made as to whether the current mode is the internal synchronous mode (step S21). If the current mode is the internal synchronous mode as a result of judgment, the processing advances to the step S28, and a reading position (reproduction point) Ptr of the packet data is calculated by the following expression (1). That is:

$$Ptr=Ptr+C \quad (1)$$

where C is a speed for reading the packet (reproduction speed). In this connection, since the reproduction point Ptr is actually a value including a decimal figure, the spline interpolation and the like is effected from the packet data in the vicinity of the reproduction point, thereby generating data at a corresponding point. Then, the processing proceeds to the step S29.

If the current mode is not the internal synchronous mode, the processing advances to the step S22, and judgment is made as to whether a timing clock (F8) has been newly received before the current reproduction timer interruption processing. If it is determined that the timing clock (F8) has been received as a result of the judgment, the reading packet number is shifted to the number of a next packet, and the F8 reception interval measured in the step S13 of the MIDI monitoring timer interruption processing is used to update the reproduction speed C. Further, the reading position is reset (set to the top of the next packet), and a predicted reception time of a next timing clock (F8) is updated (step S23).

Here, the new reproduction speed C is updated based on the size of the packet (number of data) L from which reading is started, the reception interval Δt of F8, and the reproduction timer interruption cycle F (which depends on a type of object information and hardware). That is:

$$C=\Delta t/(F\times L) \quad (2)$$

Further, a predicted reception time $t_{next}$ of a next timing clock (F8) is updated based on the following expression:

$$t_{next}=t_{last}+\Delta t \quad (3)$$

Then, the processing advances to the step S24 and judgment is made upon an out of synchronization. That is, a number of packets (packet number) at this moment is compared with a number of F8 received after start of reproduction to check if these numbers coincide with each other.

If it is determined that these numbers do not coincide with each other as a result of judgment, the processing advances to the step S25 because of the out of synchronism, and the current mode is changed to the internal synchronous mode. Further, a message informing of this change is displayed and the MIDI monitoring timer is stopped. Consequently, the synchronous processing according to reception of the timing clock is not performed, but the reproduction is continued at the current reproduction speed C. Then, the processing proceeds to the step S31. On the other hand, if these numbers coincide with each other, the processing directly advances to the step S31. In case of the external synchronous mode, the timing clock (F8) transmitted from the external MIDI equipment 2 is synchronized with the reproduction timing of each packet in the above-described manner.

On the other hand, if F8 is not received in the step S22, the processing advances to the step S26, and judgment is made as to whether the current time exceeds the time $t_{next}$ at which F8 is predicted to be received.

If it is determined that the current time exceeds the predicted time $t_{next}$ as a result of judgment, since the reading position has reached the tail end of the packet which is currently read, the processing advances to the step S27, and reading of the packet is temporarily stopped until a next clock arrives. It is to be noted that the processing is not substantially carried out in the next step S31 in this case.

On the other hand, if the current time does not exceed the predicted time $t_{next}$, the processing advances to the step S28, and the expression (1) is used to calculate the reproduction point in this reproduction timing as similar to the above-described case. Then, the processing advances to the step S29.

In the step S29, judgment is made as to whether the reproduction point calculated in the step S28 exceeds a length (size) of the packet which is currently reproduced. If it does not exceed the length, the processing advances to the step S31. However, if it exceeds the length, the packet number is updated to the number of a next packet, and the reproduction point is set to a position of the top (=0) of that packet. Then, the processing proceeds to the step S31.

As described above, after execution of the processing such as the steps S25, S30 and others, the processing advances to the step S31 where the object data is read from the reproduction point designated in each case. At this time, the reproduced data is located at a position (address) shifted rearwards from the reproduction point by an amount of the later-described offset. Subsequently, the interpolation processing is carried out with respect to the read reproduction data according to needs, and the processing for generating the reproduction output signal in this timing is performed based on this data. For example, if the object information is CG animation data, the necessary interpolation processing is applied to the read operation data, and the resulting data is transferred to the image computation unit 30. Then, updating the object is directed.

Furthermore, in the step S31, the processing time $T_{out}$ from start of this reproduction process to actual output of the object information to the outputting section 17 is measured. Here, the processing time $T_{out}$ to be measured may be either a time from commanding of reading of the reproduction data till output of the reproduction data to the outputting section 17, or a time from output of the reproduction data which has been read and subjected to the interpolation processing to processing means such as the image operating section 30 till completion of the reproduction operation (from rendering till output of data to the display unit 31 in case of CG). Moreover, an average value $T_{out}^{AV}$ of the processing time $T_{out}$ measured with respect to the reproduction data is calculated in advance, and the offset corresponding to the average value $T_{out}^{AV}$ is used as a correction value for the above-described reproduction point in case of reading the reproduction data in the step 31 of the next reproduction timer interruption processing. Therefore, as to the position of the packet data which is actually read, data is read at the position which is shifted rearwards by an amount of the offset. Consequently, it is possible to absorb a gap of synchronization depending on the hardware specifications and the like for the reproduction output timing of each medium (sounds, images and others).

Incidentally, the incoming time $t_{next}$ of the timing clock is predicted in the reproduction timer interruption processing (1) shown in FIG. 8, the processing may be carried out in accordance with whether the reading position has reached the tail end of the packet without predicting the incoming time.

FIG. 9 is a flowchart showing a modification of the reproduction timer interruption processing (1) mentioned above.

In this case, judgment is made as to whether a new timing clock (F8) has been received in the step S41. If it is determined that the timing clock (F8) has been received as a result of judgment, the processing proceeds to the step S42. Then, as similar to the step S28 in FIG. 8, the packet is shifted to the next packet, and the incremental reproduction speed is calculated based on the reception interval of F8 and a number of data in the packet. Moreover, the reproduction point is set to a position of the top of the next packet. However, the processing for updating the predicted reception time of the next timing clock (F8) is not performed. Then, the processing advances to the step S43, and judgment is made if out of synchronism occurs. In case of no out of synchronization as a result of judgment, the processing directly proceeds to the step S50. On the other hand, in case of the out of synchronization, the processing advances to the step S44, a message informing the out of synchronization and change to the internal synchronous mode is displayed. Subsequently, the current mode is switched to the internal synchronous mode, and the MIDI monitoring timer is stopped. Thereafter, the processing proceeds to the step S50.

If the timing clock (F8) has not been received and a result of judgment in the step S41 is NO, the processing advances to the step S45, and the reproduction point Ptr at which object information should be read in this reproduction timing is calculated based on the expression (1). Moreover, in the step S46, judgment is made as to whether the reproduction point Ptr calculated in the step S45 is a position exceeding the length (size) of the packet which is currently read. If it is determined that the reproduction point Ptr does not exceed the length of the packet as a result of judgment, the processing directly proceeds to the step S50. If the reproduction point Ptr exceeds the length of the packet, the processing advances to the step S47, and judgment is made as to whether the current operation mode is the internal synchronous mode. In case of the internal synchronous mode as a result of judgment, the processing proceeds to the step S48, and the packet number is updated to the number of a next packet, and the reproduction point is corrected to a position of the top of that packet. On the other hand, in case of no internal synchronous mode, namely, in case of the external synchronous mode, the processing proceeds to the step S49 and reading of the packet is temporarily stopped. It is to be noted that the substantial processing is not carried out in the next step S50 in this case.

If a result of judgment in either of the step S44 or S43 is NO and a result of judgment in either of the step S48 or S46 is NO, the step S50 is subsequently executed. The step S50 reads the reproduction data located at a position where the above-described correction processing has been carried out relative to the reproduction point designated by the packet having any packet number specified in each case mentioned above, and generates the operation data based on the read reproduction data. Further, the processing for directing updating of a display object is executed. Then, as similar to the above-described case, the time $T_{out}$ from start of the reproduction process till completion of the reproduction operation is measured, and an average value $T_{out}^{AV}$ of the measured time duration $T_{out}$ is recalculated. Consequently, as described above, it is possible to absorb the loss of synchronization depending on the hardware specification for the reproduction output timing of each medium. Thereafter, the current reproduction timer interruption processing is terminated. The above is the processing flow of the main body 1 in case of effecting the operation in the synchronous operation mode 1 shown in FIGS. 4 and 5.

Description will now be given as to the reproduction timer interruption processing in case of effecting the operation in the synchronous operation mode 2 shown in FIGS. 4(*e*) and 5(*e*). FIG. 10 is an operation flowchart of the reproduction timer interruption processing for carrying out the operation in the synchronous operation mode 2 mentioned above.

As similar to the synchronous operation mode 1, if the reproduction of the sequence data is designated by START (FA), CONTINUE (FB) or a user input event, the reproduction timer is made active, and this processing is carried out in accordance with each predetermined cycle F.

Upon starting the reproduction timer interruption processing, judgment is first made as to whether a new timing clock (F8) has been received in the step S51. Here, when operating in the internal synchronous mode, the MIDI monitoring timer is not operated as described above, and the MIDI monitoring timer interruption processing (FIG. 7) is not executed. Thus, a result of judgment in the step S51 is NO. Additionally, in case of operating in the external synchronous mode, if the timing clock (F8) has not been received with this reproduction timing, a result of judgment is also NO. If the timing clock (F8) has not been received and a result of judgment in the step S51 is NO, the processing advances to the step S60, and the position Ptr for reading the packet data is calculated based on the currently set reproduction speed C by using the expression (1).

On the other hand, if the timing clock (F8) has been received, the processing for updating the reproduction speed C, i.e., the reproduction synchronization based on the reception interval of the timing clock (F8) is executed at the step S52 in accordance with the reception time. This updating processing is the processing for updating the reproduction speed C using the expression (2) and for updating the predicted reception time $t_{next}$ of a next timing clock (F8) using the expression (3), as similar to the case of the synchronous operation mode 1 mentioned above. However, in case of the synchronous operation mode 2, the packet length (size of the packet) L is set in accordance with the reception timing of the timing clock (F8) as follows.

(a) When the clock cycle is extended:

L=an amount of remaining data of the packet which is currently reproduced

=packet length−Ptr (b) When the clock cycle is shortened:

L=an amount of remaining data of the packet which is currently reproduced+a length of a next packet =a length of the current packet+a length of a next packet−Ptr (c) When the clock cycle is not changed:

L=a length of a next packet

That is, as a result of comparing the reception time with the predicted reception time $t_{next}$ of the timing clock (F8) (step S52), (a) if the reception time of F8 is behind the predicted reception time (when the cycle of F8 is extended), a number of the remaining data of the packet which is currently reproduced is determined as L (step S53). Further, (b) if the reception time of the timing clock (F8) is ahead of the predicted reception time (when the cycle of F8 is shortened), a sum of a number of remaining data of the packet which is currently reproduced and a number of data included in a next packet is determined as L (step S54).

After setting the variable L in the step S53 or S54, the processing proceeds to the step S55, and the reproduction speed C is calculated based on the expression (2) by using the reception interval of F8 and the variable L, and the predicted reception time $t_{next}$ in the next timing, and is updated in the step S57. Furthermore, the processing advances to the step S58, and judgment is made if out of synchronization occurs in this case. However, since the packet number is not updated at this moment, the "packet number+1" is compared with a number of received timing clocks. If the out of synchronism is determined as a result of comparison, a message informing of this state is displayed, the current mode is changed to the internal synchronous mode, and the MIDI monitoring timer is stopped (step S59). Then, the processing advances to the step S60. Furthermore, if synchronism is established, the processing proceeds to the step S63, the packet number is updated, the reproduction point is set to a position of the top of that packet, and the processing advances to the step S64.

In the step S60, the reproduction point is calculated by using the reproduction speed C according to each case mentioned above. Then, in the step S61, judgment is made as to whether the calculated reproduction point exceeds the size of the current packet. If it does not exceed, the processing advances to the step S64. If it exceeds, the processing proceeds to the step S62, the packet number is updated to the number of a next packet, and that reproduction point (reading position) is corrected. That is, if the clock cycle is delayed, the reading position Ptr may exceed a range of the current packet. In such a case, the length of the current packet is subtracted from Ptr, and the obtained result is corrected to a corresponding reading position in a next packet. That is, the following expression is used:

$$Ptr = Ptr - a\ current\ packet\ length \tag{4}$$

Then, the processing proceeds to the step S64.

In the step S64, the reproduction data is read from the reproduction point determined by the step S60, S62 or S63, and the processing for generating and outputting a reproduction output signal to the outputting section is carried out. At this time, as similar to the step S31 or S50, the time required for completing the output is measured, and a deviation from the actual reproduction timing is compensated. The above is a flow of the reproduction timer interruption processing for conducting the synchronous operation mode 2 shown in FIG. 4(*e*) and FIG. 5(*e*).

Figure 11:
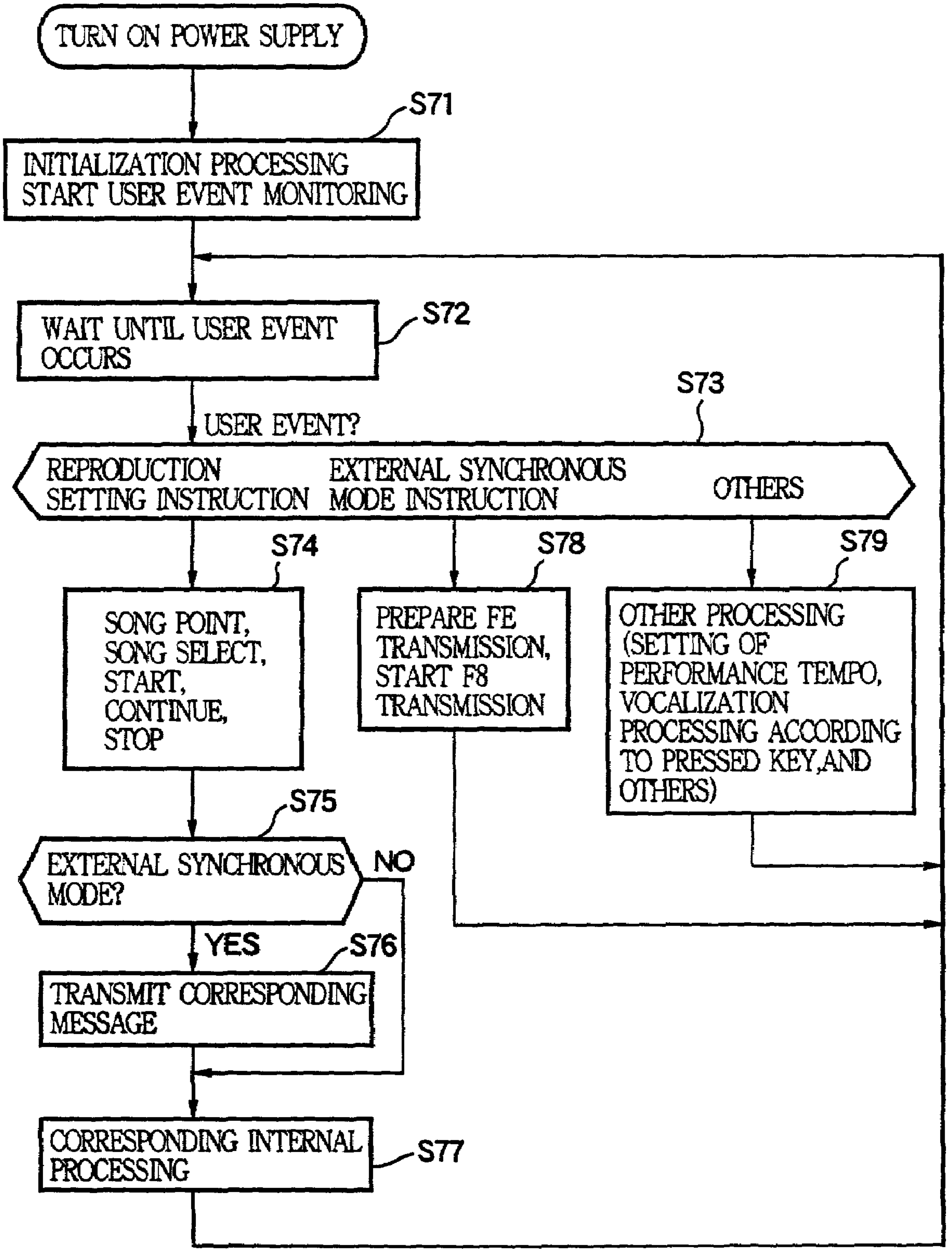
FIG. 11 is an operation flowchart of the external midi equipment.

FIG. 11 is a flowchart showing the operation of the external MIDI device 2. When the power supply is turned on, as similar to the above-described main body 1, the initialization processing is first performed, and monitoring of occurrence of a user event is started (Steps S71 and S72). Here, the user event is generated in accordance with the operation of the input operator 46 (various kinds of operators such as a switch or a lever on the operation panel, or various kinds of performance operators such as a keyboard or a wheel). When any user event is produced, a type of the user event is recognized in the step S73, and corresponding processing is carried out in accordance with a type of the user event. Then, the processing returns to the step S72 to get prepared for a next user event.

The generated user event includes a reproduction setting command such as selection of a song and reproduction data, setting of a reproduction start position, a reproduction start/stop/restart command and the like. The processing advances to the step S74, and the before-described MIDI message according to each command (SONG POSITION (F2), SONG SELECT (F3), START (FA), CONTINUE (FB), STOP (FC) and the like) is generated. Furthermore, judgment is made as to whether the current mode is set to the external synchronous mode (step S75). In case of the external synchronous mode, the corresponding MIDI message is transmitted to the main body 1, and the processing proceeds to the step S77. Moreover, if the current mode is set to the internal synchronous mode, the processing directly advances to the step S77. In the step S77, the processing in its own device according to the reproduction setting command is carried out. That is, the MIDI message according to the reproduction setting command is supplied to the sound source 48, and preparations for effecting the performance processing of the set song are made. Subsequently, the processing returns to the step S72.

If the generated user event is an external synchronous mode designation event, the processing advances to the step S78, and ACTIVE SENSING (FE) is transmitted to the external device (main body 1). In addition, transmission of the timing clock (F8) is started. Additionally, there is also started the monitoring processing by which ACTIVE SENSING (FE) is transmitted if any MIDI message is not transmitted beyond 300 msec. Then, the processing returns to the step S72. It is to be noted that transmission of the timing clock (F8) may be started after the reproduction start/restart command is made. In such a case, the timing clocks (F8) are transmitted for a predetermined number of times before transmitting START (FA) and CONTINUE (FB).

If the generated user event is other event such as setting of a performance tempo or generation of a musical tone signal according to the operation of the performance operator, the processing advances to the step S79, and the processing according to the user event is effected. For example, if the reproduction tempo (performance tempo) is changed, the transmission interval of the timing clock (F8) is changed from this moment in time (or changed after completion of reproduction of one beat or one bar) in accordance with the set tempo. Then, the processing returns to the step S72. The above is the processing operation of the external MIDI equipment 2.

Although the synchronous information reproduction apparatus according to the present invention and the embodiment of the synchronous information reproduction apparatus have been described above in detail, the present invention is not restricted thereto, and it is possible to make various modifications such as described below.

For example, in all the devices executing synchronous reproduction, the timing for actually effecting the reproduction operation may be shifted from the timing in which the timing clock (F8) has been received. That is, in all the devices, the timing clock (F8) reception timing corresponding to a predetermined number of clocks (a number of clocks corresponding to the time of approximately 100 msec is desirable) may be stored, and the reproduction operation with the clock immediately after receiving START (FA) being used as a reference may be started upon completion of reception of the predetermined number of timing clocks (F8) without executing the actual reproduction operation from F8 immediately after reception of START (FA) till reception of the predetermined number of F8.

Further, in the above-described embodiments, if SONG POSITION POINTER (F2) is received or if reproduction is stopped by STOP (FC), a number of received clocks in the reproduction timer interruption processing is set to a number corresponding to the SONG POSITION POINTER (F2) or a number corresponding to the packet position at which reproduction is stopped by STOP (FC), and then restarted. However, a number of received clocks may be always initialized to 0. In this case, judgment may be made if out of synchronism occurs in the reproduction timer interruption processing based on a number of clocks after starting the reproduction and a number of packets after starting the reproduction.

Furthermore, in the above-described embodiments, when the reception cycle of the timing clock (F8) is changed, temporary stop of reproduction, abortion of reproducing the immediately preceding packet or counting a number of samples of sequence data which should be reproduced before receiving a next timing clock (F8) is carried out in order to recalculate the reproduction speed in this section. However, if the reproduction data is sound data such as WAVE data, the pitch may be disadvantageously changed or the waveform becomes discontinuous, thereby generating noises. As a countermeasure, a joint area in which the same content as that of a packet adjacent to each packet is recorded may be set in advance, and reading of a next packet may be started without changing the reproduction speed itself (maintaining the default reproduction speed) if the timing clock (F8) is received before reaching the tail end of the packet which is currently being read. Moreover, all of the remainder in the current packet (or a predetermined number of samples) may be continuously read, and they may be cross-faded to be outputted. In addition, if the timing clock (F8) is not received even after reaching the tail end of the packet which is currently being read, the joint area at the rear of the current packet may be repeatedly read and similarly cross-faded to be outputted at the time of receiving the timing clock (F8).

In addition, in the above-described embodiments, although ACTIVE SENSING (FE) is transmitted from the external MIDI equipment 2 serving as a master, ACTIVE SENSING (FE) may be also transmitted from the main body 1 functioning as a slave so that mutual connection confirmation can be performed.

Further, in the above-described embodiments, the external MIDI equipment 2 transmits the timing clock (F8) before starting reproduction (before transmitting START (FA)). However, information concerning the transmission interval of the timing clock may be additionally transmitted to the slave (main body 1) as initialization information in advance.

Furthermore, in the above-described embodiments, as shown in FIG. 3(*b*), the reproduction data divided into blocks (divided into packets) according to each timing clock is used to generate the reproduction point in units of packet. However, the present invention can be readily applied to such a case where the reproduction data logically divided into packets is used as shown in FIG. 3(*c*). That is, in this case, the current reproduction point may be directly calculated from the top address of the reproduction data instead of effecting the processing such as updating the packet number or resetting the reproduction point (setting to the top of a next packet) in FIGS. 8 to 10.

Moreover, in spite of the fact that the clock master side (external MIDI equipment 2) transmits the timing clocks (F8) at a constant interval, the reception interval can be possibly slightly shifted for some reason. In order to cope with such a case, if the timing clock (F8) is received at a time ahead or behind the predicted reception time by a predetermined period, that clock may be regarded to be received just at the predicted reception time and the processing may be then carried out.

In addition, in each of the above-described embodiments, the time $T_{out}$ from start of the reproduction process till completion of the reproduction operation is measured every time in the steps S31, S50 and S64 in the reproduction timer interruption processing shown in FIGS. 8 to 10. However, this measurement and calculation of the average value $T_{out}^{AV}$ may be carried out at predetermined intervals (for example, one time with respect to each packet).

Additionally, the processing for correcting the reproduction point in the object information on a single medium is carried out in the above-described embodiments. In case of reproducing a plurality of object information in parallel, with one object information of a medium having the longest time required for reproduction process being used as a reference, the reproduction point may be corrected in such a manner that the output timing of other object information of other medium can be matched with the output timing of the reference object information.

Further, although the operation of the MIDI monitoring timer is stopped in case of the internal synchronous mode in the above-described embodiments, the present invention does not have to be configured in this manner. That is, the MIDI monitoring timer interruption processing is operated in advance and, in the internal synchronous mode, the timing clock (F8) is internally generated in the main body 1 at a default time interval or at a time interval corresponding to a finally calculated reproduction speed and written in the reception buffer in which the MIDI message received by the MIDI interface circuit 25 is written. In this case, the steps S21, S29 and S30 with the mark ※ in the reproduction timer interruption processing (1) shown in FIG. 8 and the steps S46 and S48 in the modification shown in FIG. 9 are no longer necessary. It is to be noted that the reproduction timer interruption processing illustrated in FIG. 10 does not have to be changed.

Furthermore, if the reproduction data is CG animation data indicative of the state of the music performance, drawing of a polygon object corresponding to a selected song may be started upon receiving the SONG SELECT (F3), and it is possible to enter the standby mode by repeatedly reading the leading data in the leading packet of the reproduction data in the same cycle as that of the reproduction timer. Moreover, when reproduction of the object data is completed to the tail end, the tail end portion of the reproduction data may be repeatedly reproduced until a command such as termination of the program or a change of the file is given. In addition, operation data for reproduction standby or termination standby may be prepared in advance, and the operation data for reproduction standby or termination standby may be repeatedly reproduced until the reproduction is started or a command such as termination of the program is given.

Additionally, connection established between the external MIDI equipment 2 (clock master) and the main body 1 (slave) can be any kind of connection as far as MIDI messages can be transmitted. That is, any interface such as the MIDI interface employed in the embodiment, the serial interface, the USB, the IEEE 1394, or the Ethernet can be used. It is to be noted that the delay time of the transmission path must be compensated in case of the Ethernet. Further, a wireless link can be used.

Furthermore, in the above-described embodiments, although the external MIDI equipment 2 is the sequencer and the main body 1 is a PC, the present invention is not restricted thereto. In brief, any type of device can be used as far as transmission/reception of the MIDI messages (or a synchronous signal at least equivalent to the timing clock (F8)) is secured. It is possible to use various kinds of devices such as a game machine, an audio device, a mobile phone, a MIDI device like an electronic musical instrument, and a general-purpose computer like a PC as the external MIDI equipment 2.

Moreover, a plurality of slaves (main body 1) for reproducing the sequence data may be provided in accordance with types of mediums for CG generation or WAVE data reproduction. In this case, when confirming connection, ACTIVE SENSING (FE) is transmitted from the clock master to a plurality of slaves.

In addition, in case of the IEEE 1394, the external MIDI equipment 2 serving as the clock master may broadcast FE (which can be of course used, or connection confirmation and the clock master may be additionally informed) to all the nodes when the power supply is turned on or the external synchronous mode is started.

Additionally, the program for carrying out the processing, the sequence of data and others may be supplied to the external storage devices 27 and 47 as well as the RAMs 23 and 43 through a communication network of a public telephone service (such as a telephone network or Internet).

As described above, according to the inventive synchronous information reproduction apparatus, the synchronous information reproduction method and the storage medium storing therein a synchronous reproduction program of the present invention, multimedia information of various kinds of mediums can be synchronously reproduced with the reduced processing burdens.

Further, since the internal processing delay depending on the hardware specifications and the like can be absorbed, multimedia information on different types of mediums can be assuredly synchronized.

Furthermore, since the external synchronous mode is switched to the internal synchronous mode when the out of synchronization and the like is caused due to, e.g., disconnection, the processing is not suddenly stopped. Moreover, by informing of this switching, a user-friendly system can be provided.

In addition, selection of a file to be reproduced and the reproduction control can be executed from an external device.

What is claimed is:

1. A synchronous information reproduction apparatus comprising:

a receiving section that is provided for sequentially receiving a clock signal;

a storing section that is provided for storing object information to be sequentially reproduced from a series of reproduction points;

a reproduction point generating section that is provided for generating location information indicative of a reproduction point of the object information stored in the storing section;

a reproducing section that is provided for reading and reproducing the object information from the storing section based on the reproduction point generated by the reproduction point generating section;

a synchronizing section that is provided for synchronizing an incremental speed of the reproduction point generated by the reproduction point generating section with a reception timing of the clock signal based on a reception time interval of the clock signals;

an outputting section that is provided for outputting contents of the object information reproduced by the reproducing section; and a reproduction point correcting section that is provided for measuring a time duration from a start of reproduction process of the object information by the reproducing section until an actual output of the object information from the outputting section, and for correcting the reproduction point in accordance with the measured time duration.

2. The synchronous information reproduction apparatus according to claim 1, further comprising a control section operative when a command by a user, an out of synchronism between the clock signal and the object information, or a stop of supply of the clock signal is detected, for suspending the operation of the synchronizing section, and for controlling the reproduction point generating section to generate the reproduction point at a predetermined incremental speed.

3. The synchronous information reproduction apparatus according to claim 1, wherein selection of the object information stored in the storing section and control of the reproduction process of the object information by the reproducing section are carried out in accordance with an externally supplied signal.

4. The synchronous information reproduction apparatus according to claim 1, wherein the object information is divided into a series of blocks in correspondence with a series of the clock signals.

5. The synchronous information reproduction apparatus according to claim 1, wherein the clock signal is provided from an external music equipment.

6. The synchronous information reproduction apparatus according to claim 1, wherein the clock signal is provided in the form of a timing message contained in MIDI data.

7. The synchronous information reproduction apparatus according to claim 1, wherein the object information has multimedia contents selected from an image, a music waveform and a voice.

8. A synchronous information reproduction apparatus comprising:

a storing section that is provided for storing a plurality of object information;

a reproduction point generating section that is provided for generating location information indicative of respective reproduction points of the plurality of the object information stored in the storing section;

a reproducing section that is provided for reading and reproducing the plurality of the object information concurrently with one another from the storing section based on the respective reproduction points generated by the reproduction point generating section;

an outputting section that is provided for outputting contents of the plurality of the object information reproduced by the reproducing section; and a reproduction point correcting section that is provided for measuring a time duration of each object information from a start of reproduction process of the object information by the reproducing section until an actual output of the object information from the outputting section, and for correcting the respective reproduction points of the plurality of the object information in accordance with the measured time duration of each object information.

9. The synchronous information reproduction apparatus according to claim 8, wherein the object information has multimedia contents selected from an image, a music waveform and a voice.

10. A synchronous information reproduction method of reproducing one or a plurality of object information stored in a storing section in synchronization with a clock signal, comprising: a reception step of sequentially receiving the clock signal;

a generation step of generating location information indicative of a reproduction point of the object information;

a reproduction step of reading and reproducing the object information from the storing section based on the reproduction point generated by the generation step;

a synchronization step of synchronizing an incremental speed of the reproduction point generated by the generation step with a reception timing of the clock signal based on a reception time interval of the clock signals; and an output step of outputting contents of the object information reproduced by the reproduction step; and a reproduction point correction step of measuring a time duration from a start of processing in the reproduction step until an actual output of the object information and correcting the reproduction point in accordance with the measured time duration.

11. The synchronous information reproduction method according to claim 10, wherein the synchronization step is stopped when a command by a user, an out of synchronism between the clock signal and the object information, or a stop of supply of the clock signal is detected, and wherein the reproduction point is generated at a predetermined incremental speed in the reproduction step.

12. A synchronous information reproduction method of reproducing a plurality of object information stored in a storing section, comprising:

a generation step of generating location information indicative of respective reproduction points of the plurality of the object information stored in the storing section;

a reproduction step of reading and reproducing the plurality of the object information from the storing section based on the respective reproduction points generated by the generation step;

an output step of outputting contents of the plurality of the object information reproduced by the reproduction step; and a reproduction point correction step of measuring a time duration of each object information from a start of processing in the reproduction step until an actual output of the object information, and correcting the reproduction point of each object information in accordance with the measured time duration.

13. A computer-readable storage medium for storing therein a program for causing a computer to reproduce one or a plurality of object information stored in a storing section in synchronization with a clock signal, wherein the program comprising:

a reception step of sequentially receiving the clock signal;

a generation step of generating location information indicative of a reproduction point of the object information;

a reproduction step of reading and reproducing the object information from the storing section based on the reproduction point generated by the generation step;

a synchronization step of synchronizing an incremental speed of the reproduction point generated by the generation step with a reception timing of the clock signal based on a reception time interval of the clock signals;

an output step of outputting contents of the object information reproduced in the reproduction step; and a reproduction point correction step of measuring a time duration from a start of processing in the reproduction step until an actual output of the object information, and correcting the reproduction point in accordance with the measured time duration.

14. The computer-readable storage medium according to claim 13, wherein the program further comprises a step of stopping the operation of the synchronization step and generating the reproduction point at a predetermined incremental speed in the reproduction step when a command by a user, an out of synchronism between the clock signal and the object information, or a stop of supply of the clock signal is detected.

15. A computer-readable storage medium for storing therein a program for causing a computer to reproduce a plurality of object information stored in a storing section, wherein the program comprises:

a generation step of generating location information indicative of respective reproduction points of the plurality of the object information;

a reproduction step of reading and reproducing the plurality of the object information concurrently with one another from the storing section based on the respective reproduction points generated by the generation step;

an output step of outputting contents of the plurality of the object information reproduced in the reproduction step; and a reproduction point correction step of measuring a time duration of each object information from a start of processing in the reproduction step until an actual output of the object information, and correcting the reproduction point of each object information in accordance with the measured time duration.

* * * * *